(12) United States Patent
Bonanno et al.

(10) Patent No.: US 8,403,112 B2
(45) Date of Patent: Mar. 26, 2013

(54) HOIST SYSTEM WITH HIGH SYSTEM POWER FACTOR

(75) Inventors: James Bonanno, Worthington, OH (US); Robert E. Eddy, Johnstown, OH (US)

(73) Assignee: Sky Climber LLC, Delaware, OH (US)

( * ) Notice: Subject to any disclaimer, the term of this patent is extended or adjusted under 35 U.S.C. 154(b) by 278 days.

(21) Appl. No.: 12/946,398

(22) Filed: Nov. 15, 2010

(65) Prior Publication Data

US 2011/0278100 A1 Nov. 17, 2011

Related U.S. Application Data

(63) Continuation-in-part of application No. 12/582,445, filed on Oct. 20, 2009, now Pat. No. 7,849,971, which is a continuation of application No. 11/267,629, filed on Nov. 4, 2005, now Pat. No. 7,631,730.

(51) Int. Cl.
*B66B 1/28* (2006.01)
(52) U.S. Cl. ......................... 187/296; 187/224; 182/148
(58) Field of Classification Search ................... 187/222, 187/224, 251, 277, 284, 289, 293, 296; 182/13, 182/14, 19, 130, 131, 141–148; 254/267, 254/290, 316, 339, 340, 362; 318/59, 61, 318/64, 68, 276, 278
See application file for complete search history.

(56) References Cited

U.S. PATENT DOCUMENTS

| | | | |
|---|---|---|---|
| 3,852,701 A | 12/1974 | Minitz et al. | |
| 3,858,688 A | 1/1975 | Galloway | |
| 4,232,903 A | 11/1980 | Welling et al. | |
| 4,300,134 A | 11/1981 | Paciorek | |
| 4,462,484 A | 7/1984 | Crudele | |
| 4,600,085 A | 7/1986 | Gagnon et al. | |
| 4,821,842 A | 4/1989 | Cavalieri | |
| 5,134,356 A * | 7/1992 | El-Sharkawi et al. | ........ 323/211 |
| 5,167,401 A | 12/1992 | James et al. | |
| 6,075,350 A * | 6/2000 | Peng | .............................. 323/207 |
| 6,247,680 B1 | 6/2001 | Cohen | |
| 6,405,114 B1 | 6/2002 | Priestley et al. | |
| 6,439,458 B1 | 8/2002 | Drotning | |
| 6,598,859 B1 | 7/2003 | Kureck et al. | |
| 7,024,805 B2 | 4/2006 | Onsager et al. | |
| 7,537,090 B2 | 5/2009 | Vantanen et al. | |

(Continued)

OTHER PUBLICATIONS

International Search Report and Written Opinion of the International Searching Authority for International Application No. PCT/US06/19266, mailed Sep. 26, 2007.

(Continued)

*Primary Examiner* — Anthony Salata
(74) *Attorney, Agent, or Firm* — David J. Dawsey; Michael J. Gallagher; Gallagher & Dawsey Co., LPA

(57) ABSTRACT

A suspension work platform hoist system having reduced reactive power to produce a hoist system power factor of at least 0.95 when operating at a steady state full-load condition as the motor raises the work platform. The hoist system power factor takes into account all the power consuming devices of the suspension work platform hoist system as well as a suspended conductor system that connects the constant frequency input power source to the hoist, which is often in excess of several hundred feet. The hoist system power factor may be achieved by incorporating a reactive power reducing input power system into the suspension work platform hoist system. The reactive power reducing input power system decreases the magnitude of the reactive power of the motor producing a high hoist system power. The reactive power reducing input power system may include an AC-DC converter and a regulator system in electrical communication with a DC-AC inverter that is in electrical communication with the motor.

15 Claims, 25 Drawing Sheets

U.S. PATENT DOCUMENTS

| | | | |
|---|---|---|---|
| 7,849,971 B2 * | 12/2010 | Anasis et al. ........... 187/296 |
| 2005/0088769 A1 | 4/2005 | Baumgart et al. |
| 2007/0102242 A1 | 5/2007 | Anasis et al. |
| 2008/0087497 A1 | 4/2008 | Boswell et al. |
| 2008/0093176 A1 | 4/2008 | Rosenthal |
| 2008/0208389 A1 | 8/2008 | Checketts |
| 2009/0220300 A1 | 9/2009 | Stanley |

OTHER PUBLICATIONS

International Search Report and Written Opinion of the International Searching Authority for the International Application No. PCT/US2011/058927, mailed Mar. 16, 2012. 13 pages.

* cited by examiner

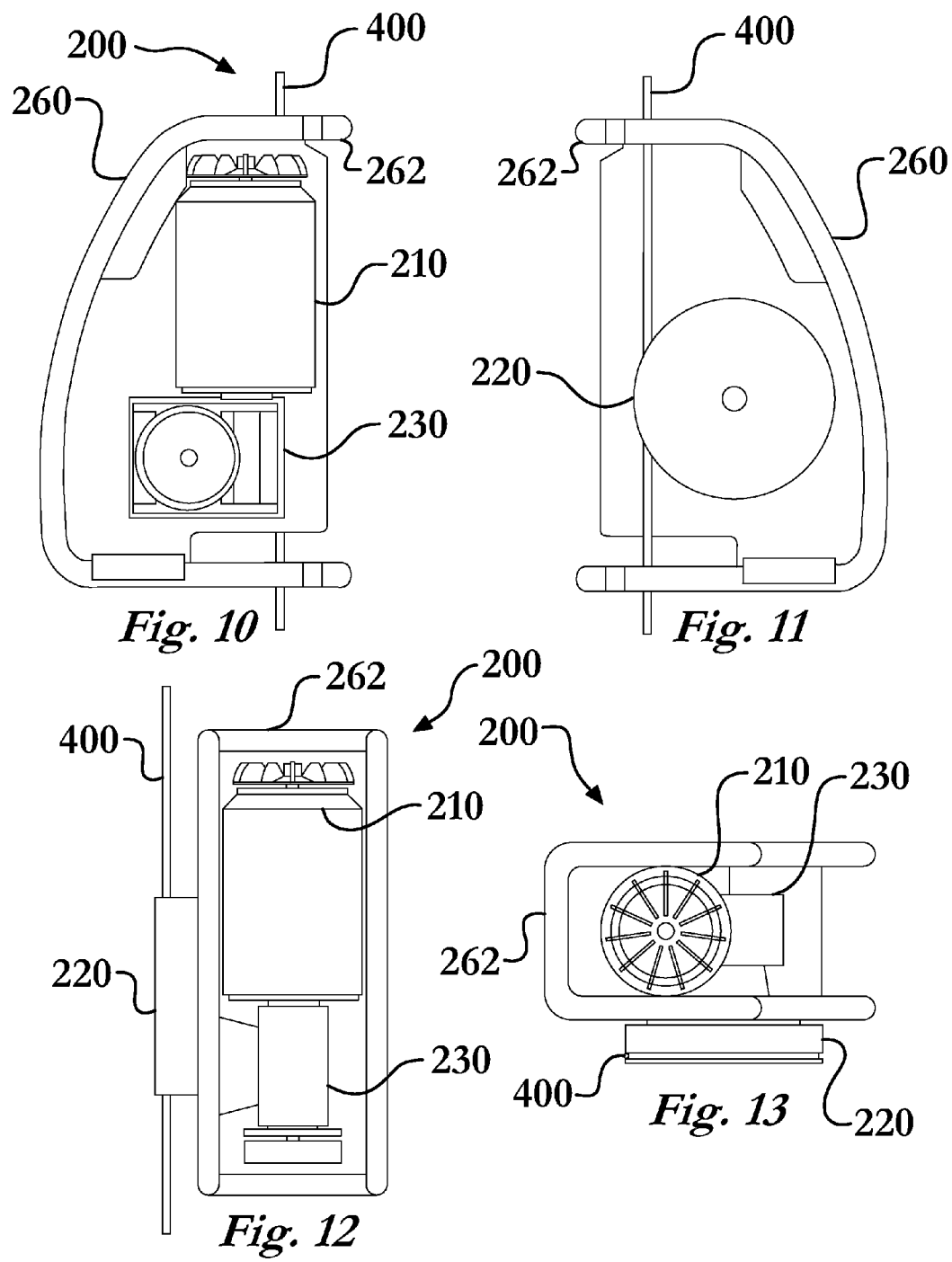

ns is desired.

HOIST SYSTEM WITH HIGH SYSTEM POWER FACTOR

CROSS REFERENCE TO RELATED APPLICATIONS

This application is a continuation-in-part of U.S. patent application Ser. No. 12/582,445, filed Oct. 20, 2009 now U.S. Pat. No. 7,849,971, which is a continuation of U.S. patent application Ser. No. 11/267,629, filed Nov. 4, 2005, now U.S. Pat. No. 7,631,730. The entire content of each application is incorporated by reference herein.

TECHNICAL FIELD

The instant invention relates to suspended work platform hoist systems, particularly hoist control systems having a high system power factor, acceleration control, and tilt control of a suspended work platform.

BACKGROUND OF THE INVENTION

Suspension type work platforms, also commonly referred to as access platforms, are well-known in the art. Such platforms are typically powered by a hoist at each end of the platform that raises and lowers the platform on an associated suspension wire at each end. The hoists are generally very simple machines including an electric induction motor, a gearbox, and a traction mechanism that grips the wire. Generally the electric motors are single-speed motors, however two-speed motors are available. Traditionally the motors incorporate across-the-line starters and therefore switch from off to full speed at the press of a button. The gearboxes reduce the motor speed resulting in a platform velocity generally ranging from 27 feet per minute (fpm) to 35 fpm. Therefore, the acceleration of the work platform from standing still to 27 fpm, or more, occurs essentially instantaneously and is jarring and dangerous, not only to the occupants but also the roof beams, or anchorage points.

Similarly, traditional systems offer no control over a powered deceleration of the work platform. This is particularly problematic when trying to stop the work platform at a particular elevation since the platform approaches the elevation at full speed and then stops instantaneously. This crude level of control offered by traditional systems results in repeated starting, stopping, and reversing, or "hunting," before the desired elevation is obtained. Such repeated starts and stops not only prematurely wear the equipment, but are dangerous to the work platform occupants.

Additionally, the hoists used in suspended work platform systems are often several hundred feet from a power source making voltage drop through the conductors a concern that often results in motors overheating, premature failure, stalling, and the introduction of boost transformers. For instance, a typical window washing application may require that a work platform be suspended over five hundred feet from the location of the power source, which is typically at the top of the building. Such systems often require boost transformers located at the top of the building so that the voltage at the location of the hoist remains high enough to facilitate proper operation of the motor(s).

What has been missing in the art has been a system by which the users, employers, equipment manufacturers, or the hoist controls themselves can control the acceleration of the work platform. Further, a system in which the velocity can be adjustably limited depending on the particular working conditions is desired.

SUMMARY OF INVENTION

In its most general configuration, the state of the art is improved with a variety of new capabilities and overcomes many of the shortcomings of prior devices in new and novel ways. In its most general sense, the shortcomings and limitations of the prior art are overcome in any of a number of generally effective configurations.

The present suspension work platform hoist system is designed for raising and lowering a suspended work platform. The work platform is raised and lowered on one or more wire ropes. The suspension work platform hoist system includes at least one hoist. More commonly a sinistral hoist and a dextral hoist are attached to opposite ends of the work platform. In one embodiment, the hoist has a motor in electrical communication with a variable acceleration motor control system. The variable acceleration motor control system is releasably attached to the work platform and is in electrical communication with a constant frequency input power source and the hoist motor.

The variable acceleration motor control system controls the acceleration of the work platform as it is raised and lowered, under power, on the ropes by controlling the hoist motor. The suspension work platform hoist system also includes a platform control system releasably attached to the work platform that is in electrical communication with the variable acceleration motor control system and the hoist motor(s). The platform control system may include a user input device designed to accept instructions to raise or lower the work platform.

The variable acceleration motor control system not only controls the acceleration of the work platform in the conventional sense of positive acceleration, but it also controls the negative acceleration, or deceleration, of the work platform. This provides the ability to slowly approach a particular elevation, from above or below, in a controlled fashion so that the elevation is not passed, or overshot.

The variable acceleration motor control system controls the acceleration of the work platform so that it reaches a maximum velocity in no less than a predetermined time period. The time period is a minimum of 1 second, but is more commonly 2-5 seconds, or more depending on the use of the work platform. In one embodiment the variable acceleration motor control system achieves the acceleration control by converting the constant frequency input power to a variable frequency power supply. This may be accomplished through the use of a variable frequency drive that converts the constant frequency input power source to a variable frequency power supply connected to the hoist motors. The system may incorporate one variable frequency drive that controls both motors, an individual variable frequency drive for controlling each motor separately, or a variable frequency drive for each hoist that can control both motors, as will be disclosed in detail in the Detailed Description of the Invention.

Further, the suspension work platform hoist system may include a system designed to reduce the reactive power associated with conventional suspended hoist systems and produce a hoist system power factor of at least 0.95 when operating at a steady state full-load condition as the motor raises the work platform. The hoist system power factor takes into account all the power consuming devices of the suspension work platform hoist system as well as a suspended conductor system that connects the constant frequency input power source to the hoist, which is often in excess of several hundred feet. A further embodiment achieves a hoist system power factor of at least 0.98 when operating at a steady state full-load condition.

In one embodiment, the hoist system power factor is achieved by incorporating a reactive power reducing input power system into the suspension work platform hoist system. The reactive power reducing input power system includes an AC-DC converter and a regulator system, wherein the regulator system is in electrical communication with a DC-AC inverter that is in electrical communication with the motor. The DC-AC inverter controls the rate at which the motor accelerates the traction mechanism thereby controlling the acceleration of the work platform as the work platform is raised and lowered on the rope. Alternatively, the hoist system (10) may be a constant acceleration hoist system incorporating a reactive power reducing input power system having a capacitor bank adjacent the motor to achieve the hoist system power factor of at least 0.95 in steady state full-load condition.

A further embodiment further including an isolation system that electrically isolates the DC-AC inverter from the motor when the DC-AC inverter is not transmitting power to the motor. The isolation system prevents any current generated by the rotation of the motor during an unpowered descent of the work platform from coming in contact with the DC-AC inverter. Yet a further embodiment includes a descent control system between the isolation system and the motor, wherein in an emergency descent mode the descent control system electromagnetically controls the emergency descent of the work platform under the influence of gravity and limits the emergency descent velocity to 60 feet per minute, and more preferably limits the emergency descent velocity to 45 feet per minute or less. If utility power is lost the work platform is locked by a mechanical brake and remains suspended in the air for the operators' safety. If this happens, the mechanical brake may be released manually to enter the emergency descent mode and to allow the work platform to descend to the ground at the emergency descent velocity.

The suspension work platform hoist system may further include a tilt control system. The tilt control system is in electrical communication with the variable acceleration motor control system and includes at least one tilt controller and at least one tilt sensor. The tilt control system is capable of detecting the tilt angle of the work platform and controlling the variable acceleration motor control system so that the work platform reaches and maintains a tilt angle setpoint as the work platform is raised and lowered.

Variations of the platform control system may include a GPS tracking system as well as a remote wireless transmitter and a receiver. In such variations, the remote wireless transmitter transmits commands to the receiver using spread spectrum communications. Additionally, the remote wireless transmitter may include some, or all, of the controls of the user input device(s). These variations, modifications, alternatives, and alterations of the various preferred embodiments may be used alone or in combination with one another, as will become more readily apparent to those with skill in the art with reference to the following detailed description of the preferred embodiments and the accompanying figures and drawings.

BRIEF DESCRIPTION OF THE DRAWINGS

Without limiting the scope of the suspension work platform hoist system as claimed below and referring now to the drawings and figures:

FIG. 10 is a left side elevation view of an embodiment of a hoist of the suspension work platform hoist system, not to scale;

FIG. 11 is a right side elevation view of an embodiment of a hoist of the suspension work platform hoist system, not to scale;

FIG. 12 is a rear elevation view of an embodiment of a hoist of the suspension work platform hoist system, not to scale;

FIG. 13 is a top plan view of an embodiment of a hoist of the suspension work platform hoist system, not to scale;

DETAILED DESCRIPTION OF THE INVENTION

The presently disclosed suspension work platform hoist system (10) enables a significant advance in the state of the art. The preferred embodiments of the device accomplish this by new and novel arrangements of elements and methods that are configured in unique and novel ways and which demonstrate previously unavailable but preferred and desirable capabilities. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 14:
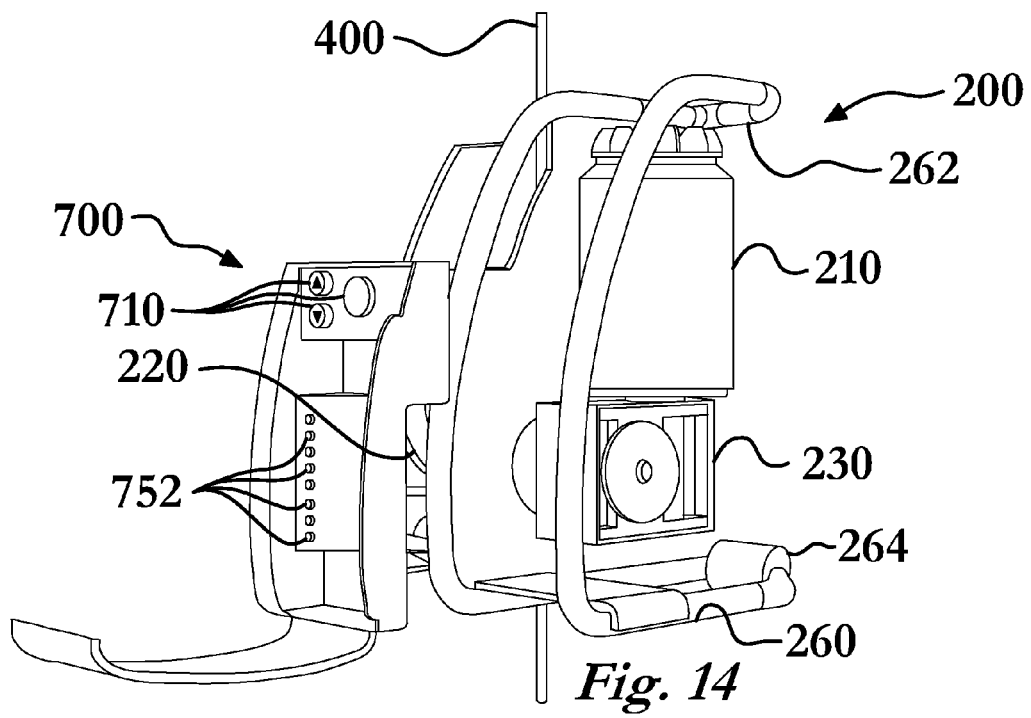
FIG. 14 is a perspective assembly view of an embodiment of a hoist of the suspension work platform hoist system, not to scale.
Figure 15:
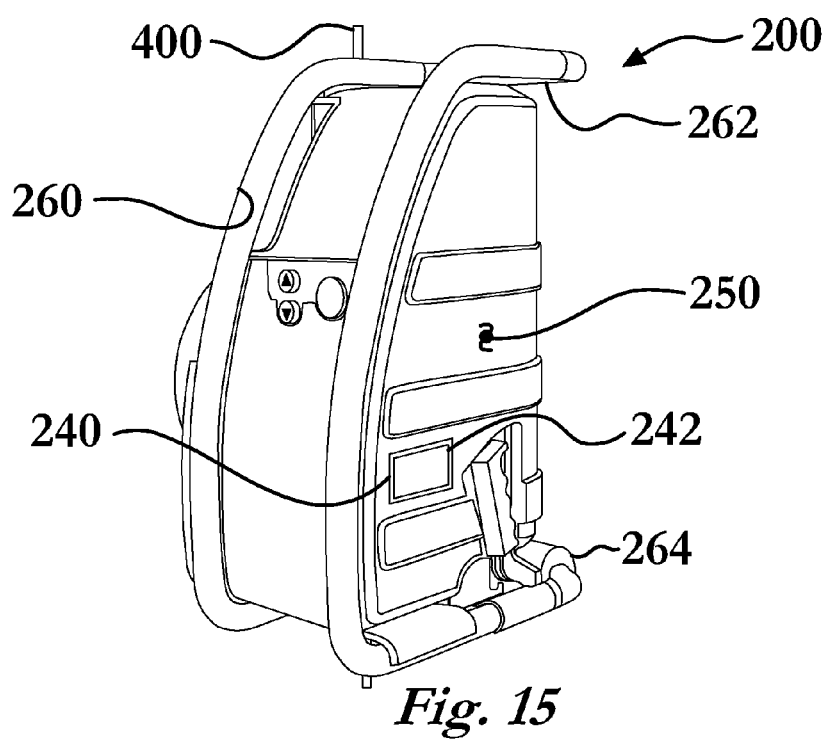
FIG. 15 is a perspective view of an embodiment of a hoist of the suspension work platform hoist system, not to scale.
Figure 16:
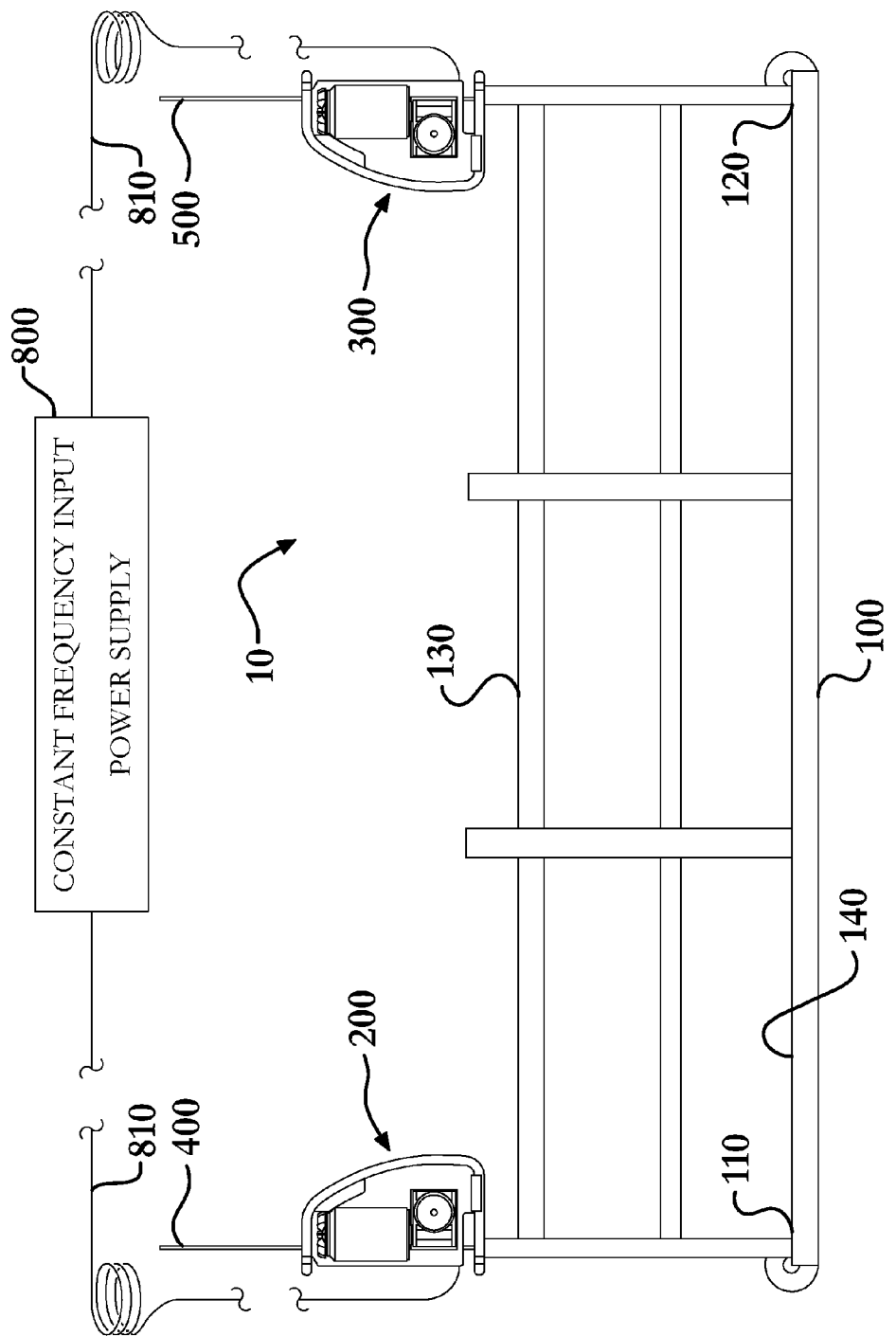
FIG. 16 is a front elevation view of an embodiment of a work platform of the suspension work platform hoist system, not to scale.

A suspension work platform hoist system (10) for raising and lowering a work platform (100). In one embodiment, as seen in FIG. 16, the work platform (100) is raised and lowered on two wire ropes, namely a sinistral rope (400) and a dextral rope (500), however the work platform (100) may be raised and lowered on a single rope by a single hoist. Thus, the work platform (100) may be a platform in the traditional sense of a horizontal structure designed for standing upon, however it also includes man lifts, cage lifts, bosun's chairs, and any structure designed to support a worker from a suspension rope, while accommodating changes in elevation. Generally, the work platform (100) has a sinistral end (110) and a dextral end (120). In one embodiment, the suspension work platform hoist system (10) includes a sinistral hoist (200) that is releasably attached to the work platform (100) near the sinistral end (110) and cooperates with the sinistral rope (400), and a dextral hoist (300) that is releasably attached to the work platform (100) near the dextral end (110) and cooperates with the dextral rope (500). Now, referring to FIGS. 10-15, the sinistral hoist (200) has a sinistral motor (210) and the dextral hoist (300) has a dextral motor (310), and each motors (210, 310) is in electrical communication with at least one variable acceleration motor control system (600). While FIGS. 10-15 illustrate only the sinistral hoist (200) and its components, the same figures apply equally to the dextral hoist (300) since they are identical, merely substituting 300 series element numbers in place of the 200 series element numbers.

Figure 1:
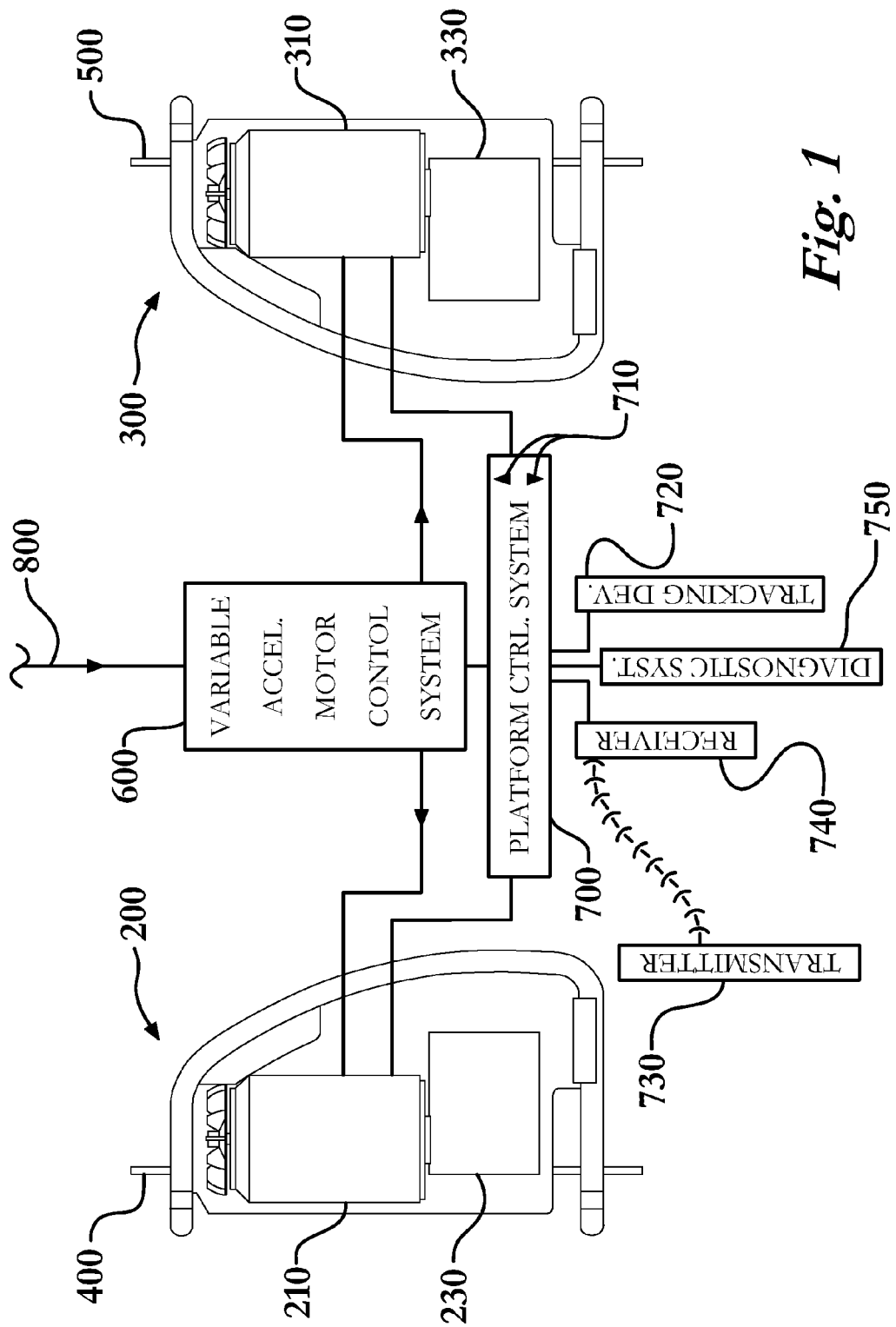
FIG. 1 is a schematic of an embodiment of the suspension work platform hoist system, not to scale.

With reference now to FIG. 1, the variable acceleration motor control system (600) is releasably attached to the work platform (100) and is in electrical communication with a constant frequency input power source (800) and the sinistral motor (210) and the dextral motor (310). The variable acceleration motor control system (600) controls the acceleration of the work platform (100) as the work platform (100) is raised and lowered on the sinistral rope (400) and the dextral rope (500) by controlling the sinistral motor (210) and the dextral motor (310). Lastly, the suspension work platform hoist system (10) may include a platform control system (700) releasably attached to the work platform (100) and in electrical communication with the variable acceleration motor control system (600), the sinistral motor (210), and/or the dextral motor (300), and has a user input device (710) designed to accept instructions to raise or lower the work platform (100).

In addition to the sinistral motor (210), the sinistral hoist (200) has a sinistral traction mechanism (220), seen best in FIGS. 11-12, designed to cooperate with the sinistral rope (400), and a sinistral gearbox (230) for transferring power from the sinistral motor (210) to the sinistral traction mechanism (220). Similarly, the dextral hoist (300) has a dextral traction mechanism (320) designed to cooperate with the dextral rope (300), and a dextral gearbox (330) for transferring power from the dextral motor (310) to the dextral traction mechanism (320). The sinistral hoist (220) is releasably attached to the work platform (100) near the sinistral end (110) and the dextral hoist (320) is releasably attached to the work platform (100) near the dextral end (120). The work platform (100) includes a floor (140) and a railing (130), as seen in FIG. 16.

Referring again to FIG. 1, the variable acceleration motor control system (600) is in electrical communication with the constant frequency input power source (800). Such a power source may be any of the conventional alternating current power sources used throughout the world, including, but not limited to, single phase, as well as three phase, 50 Hz, 60 Hz, and 400 Hz systems operating at 110, 120, 220, 240, 380, 480, 575, and 600 volts. The variable acceleration motor control system (600) controls the rate at which the sinistral motor (210) accelerates the sinistral traction mechanism (220) and/or the rate at which the dextral motor (310) accelerates the dextral traction mechanism (320) thereby controlling the acceleration of the work platform (100) as the work platform (100) is raised and lowered on either, or both, the sinistral rope (400) and the dextral rope (500).

The variable acceleration motor control system (600) not only controls the acceleration of the work platform (100) in the conventional sense of positive acceleration, but it also controls the negative acceleration, or deceleration, of the work platform (100). Such control not only eliminates bone jarring starts and stops characteristic of single-speed and two-speed hoists, but also provides the ability to slowly approach a particular elevation, from above or below, in a controlled fashion so that the elevation is not passed, or overshot. In fact, in one embodiment the variable acceleration motor control system (600) includes an approach mode having an adjustable approach velocity setpoint which limits the velocity of the work platform (100) to a value of fifty percent, or less, of the maximum velocity.

The variable acceleration motor control system (600) provides the user the ability to control the acceleration and set a particular working velocity of the work platform (100). For example, if the work platform (100) is being used for window washing then the work platform (100) is being advanced relatively short distances at a time, typically 10-12 feet, as the work platform (100) is moved from floor to floor. In such a situation there is no need to allow the work platform (100) to accelerate to the maximum velocity when advancing a floor at a time. Therefore, in one embodiment the variable acceleration motor control system (600) permits the establishment of an adjustable maximum working velocity, which is a great safety improvement because advancing from floor to floor at a controlled working velocity that is a fraction of the maximum velocity reduces the likelihood of accidents.

Such a system still allows the user to command the variable acceleration motor control system (600) to accelerate to the maximum velocity when traversing more significant distances. Therefore, the variable acceleration motor control system (600) controls the acceleration of the work platform (100) so that the work platform (100) reaches a maximum velocity in no less than a predetermined time period to eliminate the bone jarring starts previously discussed as being associated with single-speed and two-speed hoist systems. The time period is a minimum of 1 second, but is more commonly 2-5 seconds, or more, depending on the use of the work platform (100). For instance, greater time periods may be preferred when the work platform (100) is transporting fluids such as window washing fluids or paint.

Figure 2:
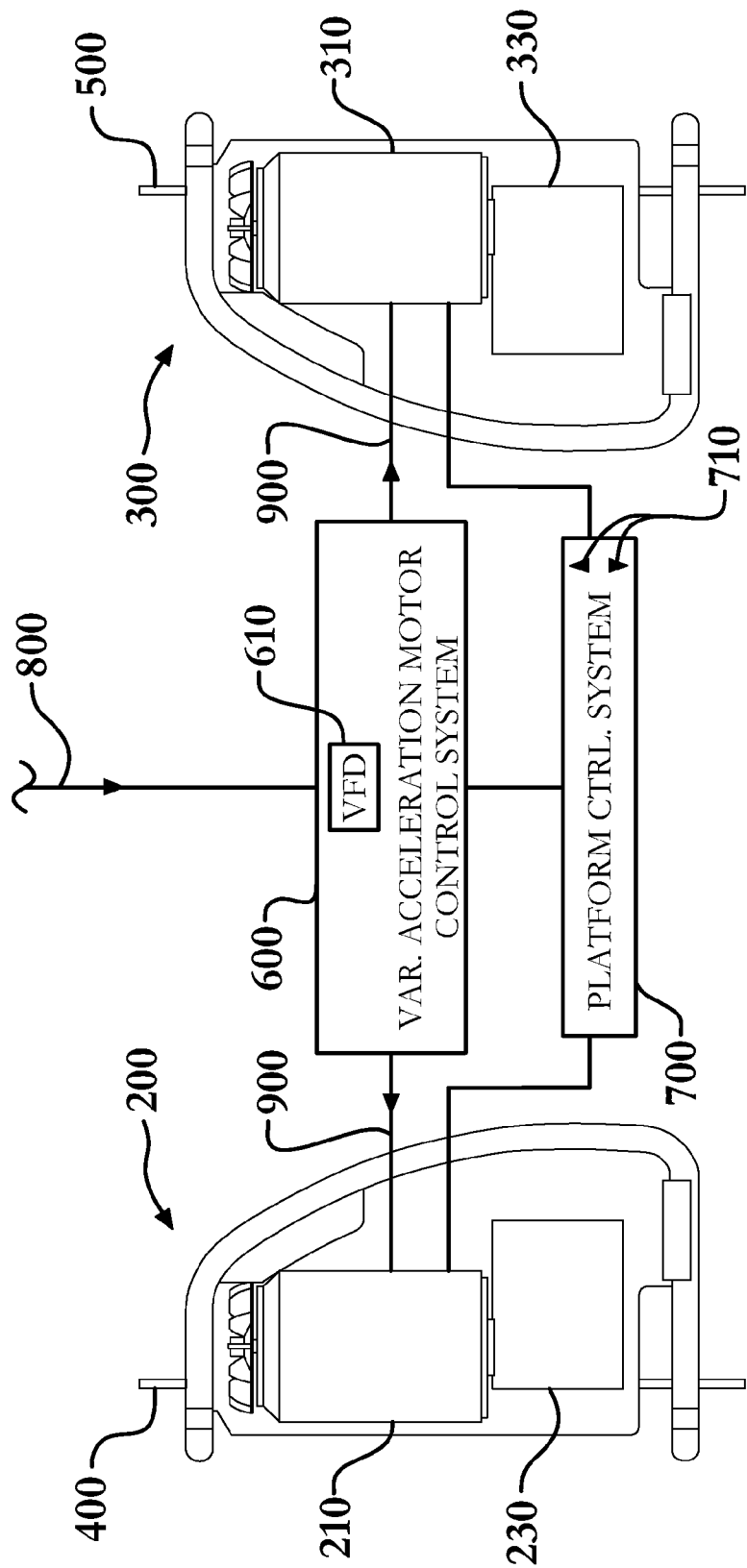
FIG. 2 is a schematic of an embodiment of the suspension work platform hoist system, not to scale.

As previously mentioned, the variable acceleration motor control system (600) is in electrical communication with the constant frequency input power (800) and the sinistral motor (210) and/or dextral motor (310), as seen in FIG. 1. In one embodiment, the variable acceleration motor control system (600) achieves the acceleration control by converting the constant frequency input power to a variable frequency power supply (900) in electrical communication with one, or more, of the motors (210, 310), as seen in FIG. 2. In one particular embodiment the variable acceleration motor control system (600) includes a variable frequency drive (610) that converts the constant frequency input power source (800) to a variable frequency power supply (900) connected to the sinistral motor (210) and the dextral motor (310). As used herein, the term variable frequency drive (610) means a configuration incorporating at least an AC-DC converter (640) and a DC-AC inverter (670), as seen schematically in FIG. 26, whether or not they are housed in what some would refer to as a packaged variable frequency drive, or integrated into a system containing an AC-DC converter (640) and a DC-AC inverter (670).

Figure 3:
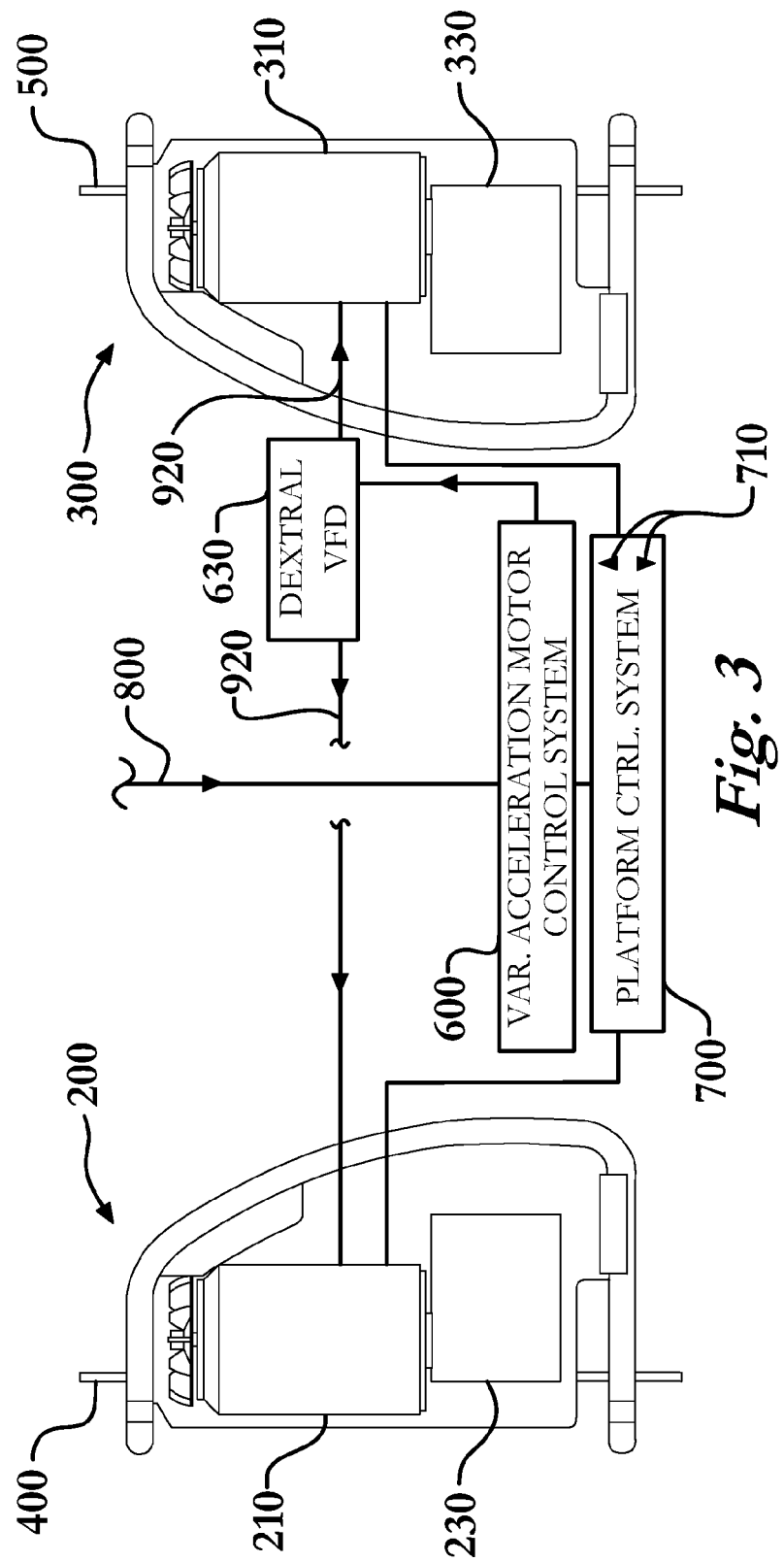
FIG. 3 is a schematic of an embodiment of the suspension work platform hoist system, not to scale.
Figure 4:
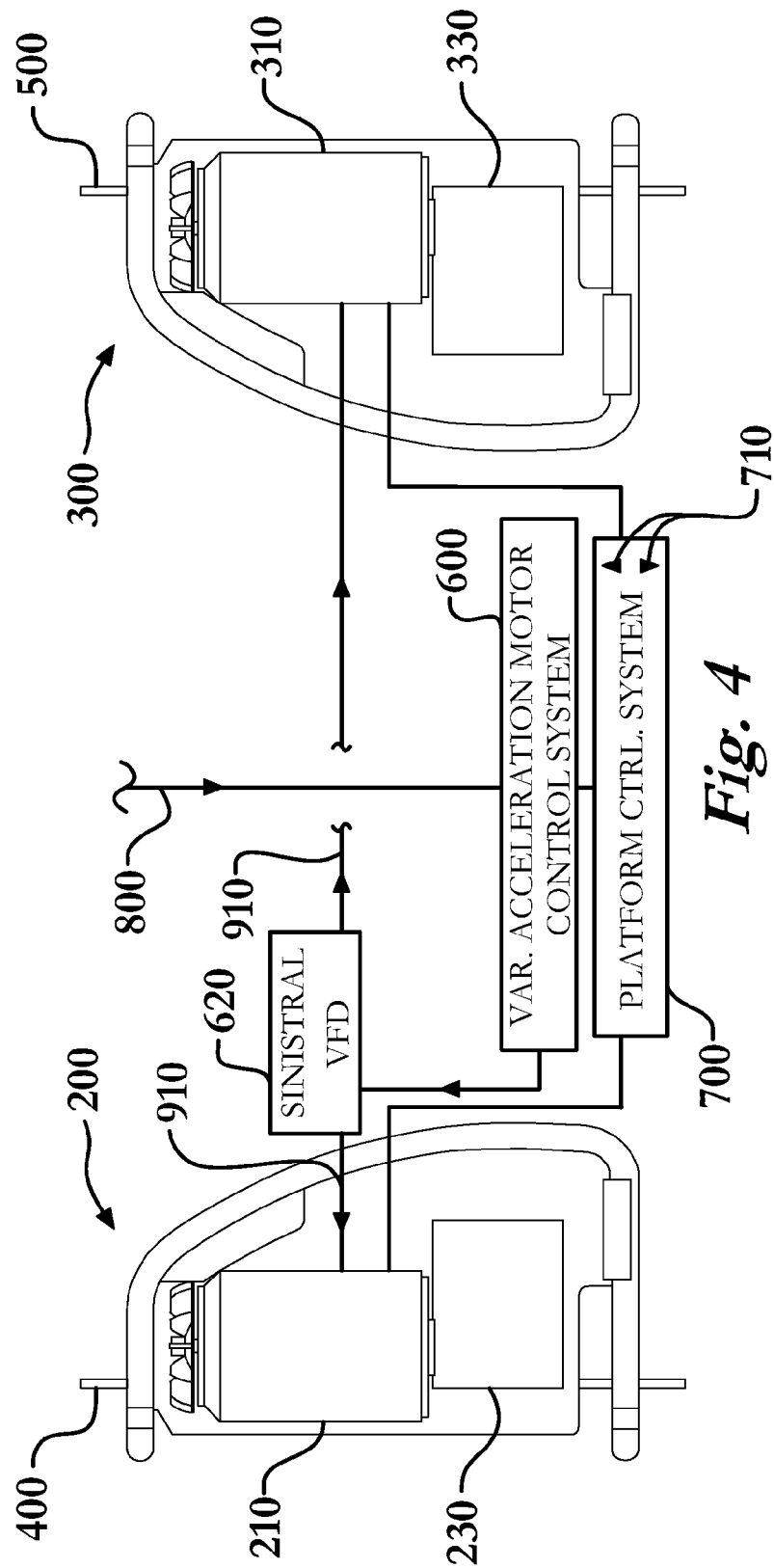
FIG. 4 is a schematic of an embodiment of the suspension work platform hoist system, not to scale.

The variable frequency drive (610) embodiment may include a further embodiment in which a single variable frequency drive (610) is used to control both the sinistral motor (210) and the dextral motor (310). For example, a single sinistral variable frequency drive (620) may be incorporated to convert the constant frequency input power source (800) to a sinistral variable frequency power supply (910) in electrical communication with the sinistral motor (210) and the dextral motor (310) such that the sinistral motor (210) and the dextral motor (310) are powered in unison by the sinistral variable frequency power supply (910), as seen in FIG. 4. Alternatively, the variable acceleration motor control system (600) may include a dextral variable frequency drive (630) that converts the constant frequency input power source (800) to a dextral variable frequency power supply (920) in electrical communication with the sinistral motor (210) and a dextral motor (310) such that the sinistral motor (210) and the dextral motor (310) are powered in unison by the dextral variable frequency power supply, as seen in FIG. 3. Typically, the single variable frequency drive (610), whether it be the sinistral variable frequency drive (620) or the dextral variable frequency drive (630), is mounted within the body of either the sinistral hoist (200) or the dextral hoist (300), with the rest of the variable acceleration motor control system (600). Therefore, in this embodiment conductors connected to the constant frequency input power source (800) would connect to one of the hoists (200, 300) and power that particular variable frequency drive (610, 620) that would then provide a variable frequency power supply (910, 920) to both motors (210, 310), one with conductors merely connecting the variable frequency drive (610, 620) to the motor (210, 310) within the hoist (200, 300) and the other with conductors traversing the work platform (100) to connect to and power the other hoist (200, 300).

Figure 5:
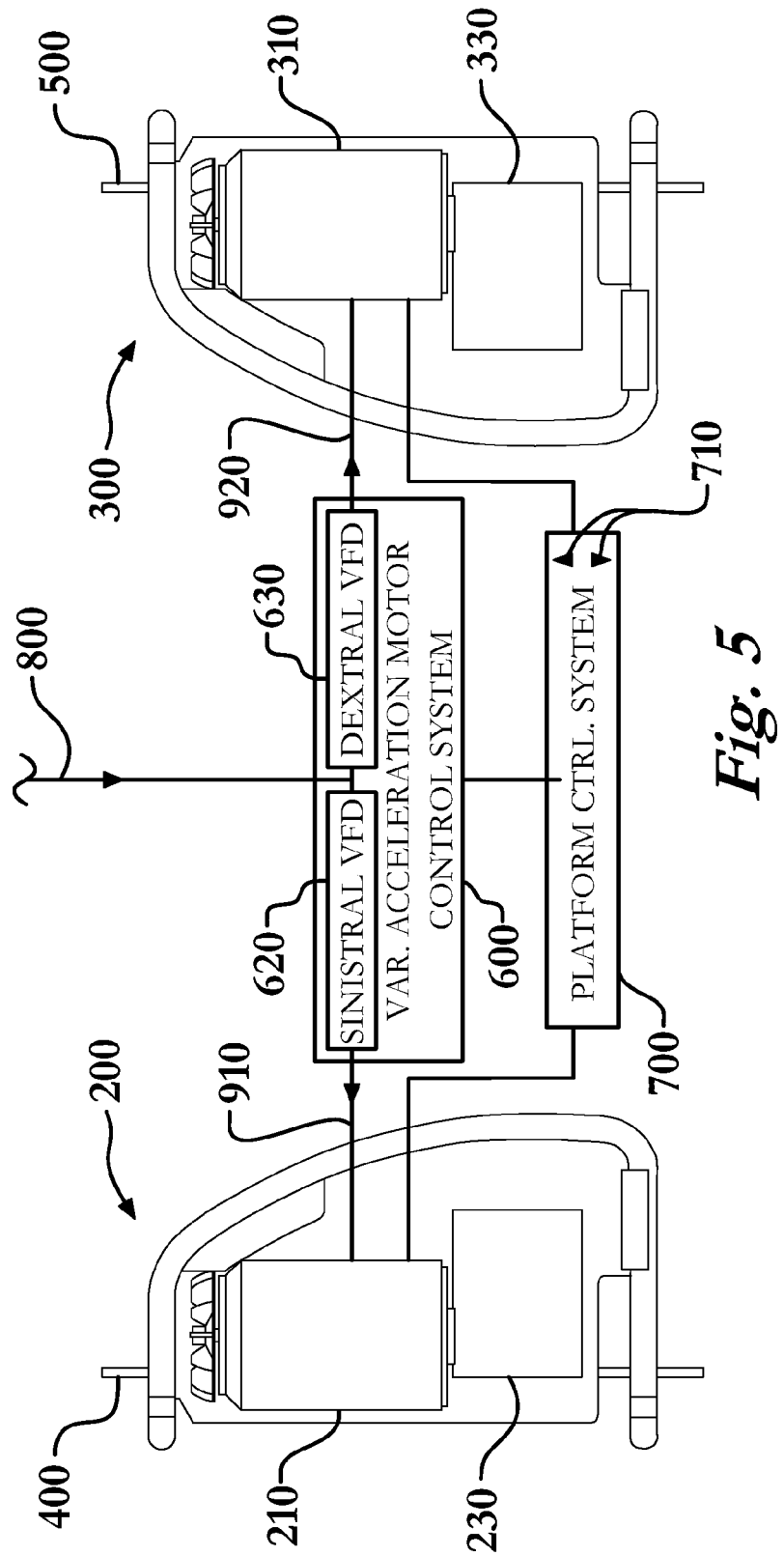
FIG. 5 is a schematic of an embodiment of the suspension work platform hoist system, not to scale.
Figure 6:
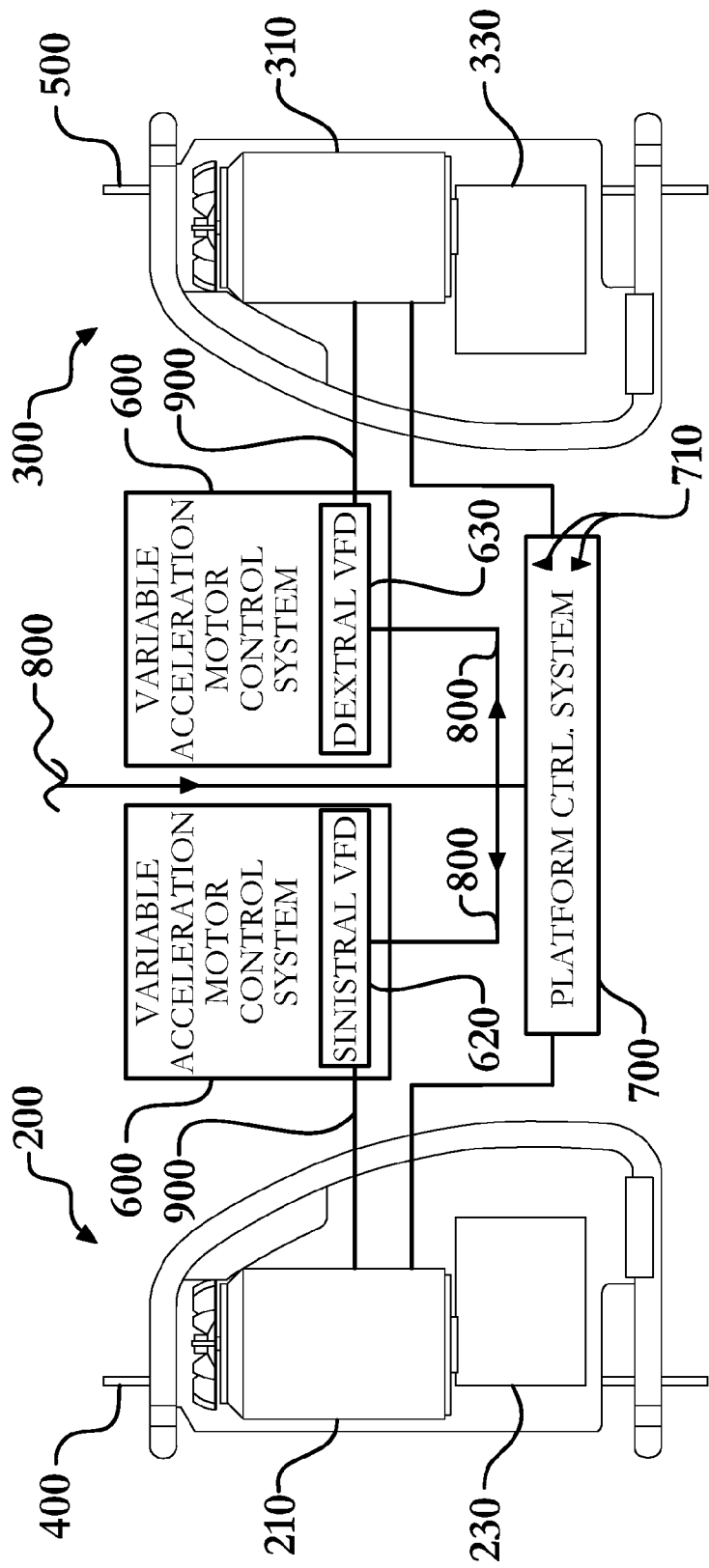
FIG. 6 is a schematic of an embodiment of the suspension work platform hoist system, not to scale.

In an alternative variable frequency drive (610) embodiment both the sinistral motor (210) and the dextral motor (310) are associated with their own variable frequency drive, namely a sinistral variable frequency drive (620) and a dextral variable frequency drive (630), as seen in FIGS. 5 and 6. The variable frequency drives (620, 630) may be centrally housed, as seen in FIG. 5, or located at, or in, the individual hoists (200, 300), as seen in FIG. 6. In one embodiment each variable frequency drive (620, 630) powers only the associated motor (210, 310), as seen in FIGS. 5-6. In an alternative embodiment seen in FIGS. 7-9, the sinistral variable frequency drive (620) and a dextral variable frequency drive (630) are each sized to power both motors (210, 310) and never only power a single motor, thereby introducing a field configurable redundant output power supply capability. Referring first to the embodiment of FIG. 6 wherein the sinistral variable frequency drive (620) only powers the sinistral motor (210) and the dextral variable frequency drive (630) only powers the dextral motor (310), the two drives (620, 630) are still a part of the variable acceleration motor control system (600), regardless of the fact that each drive (620, 630) will most likely be housed within the associated hoist (200, 300), and therefore offer all of the previous described control benefits, and each drive (620, 630) may be controlled in unison with a common control signal.

Figure 7:
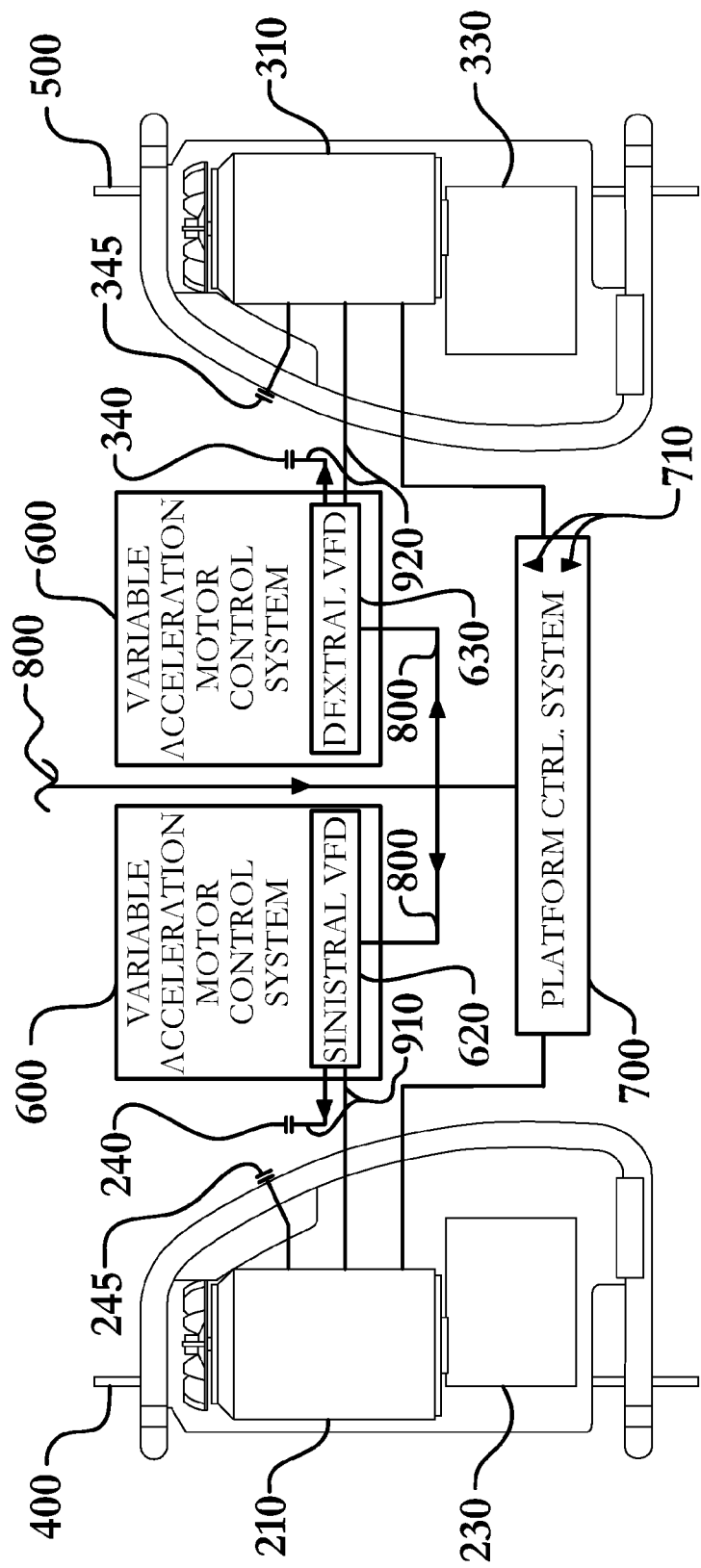
FIG. 7 is a schematic of an embodiment of the suspension work platform hoist system, not to scale.
Figure 8:
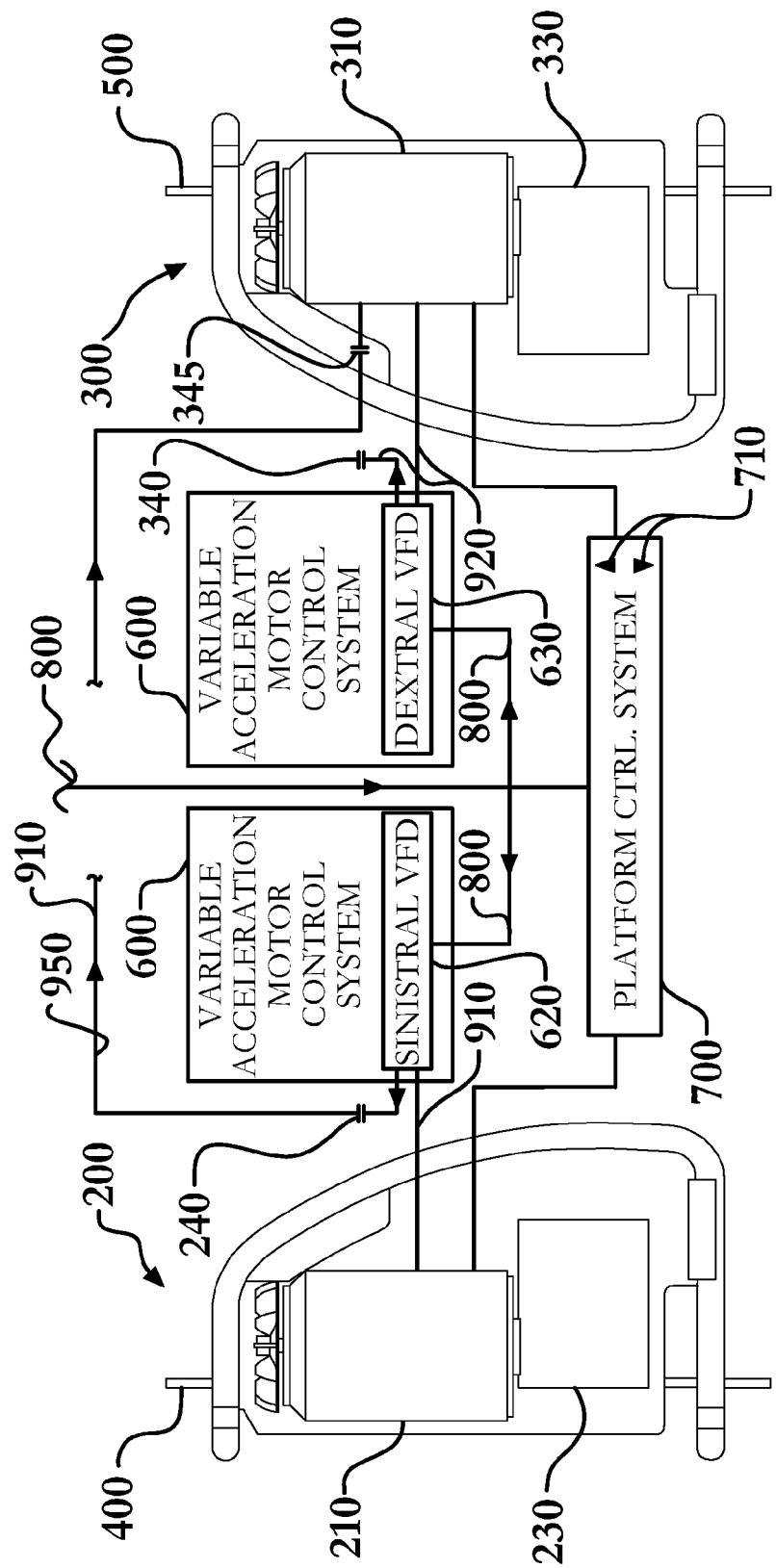
FIG. 8 is a schematic of an embodiment of the suspension work platform hoist system, not to scale.
Figure 9:
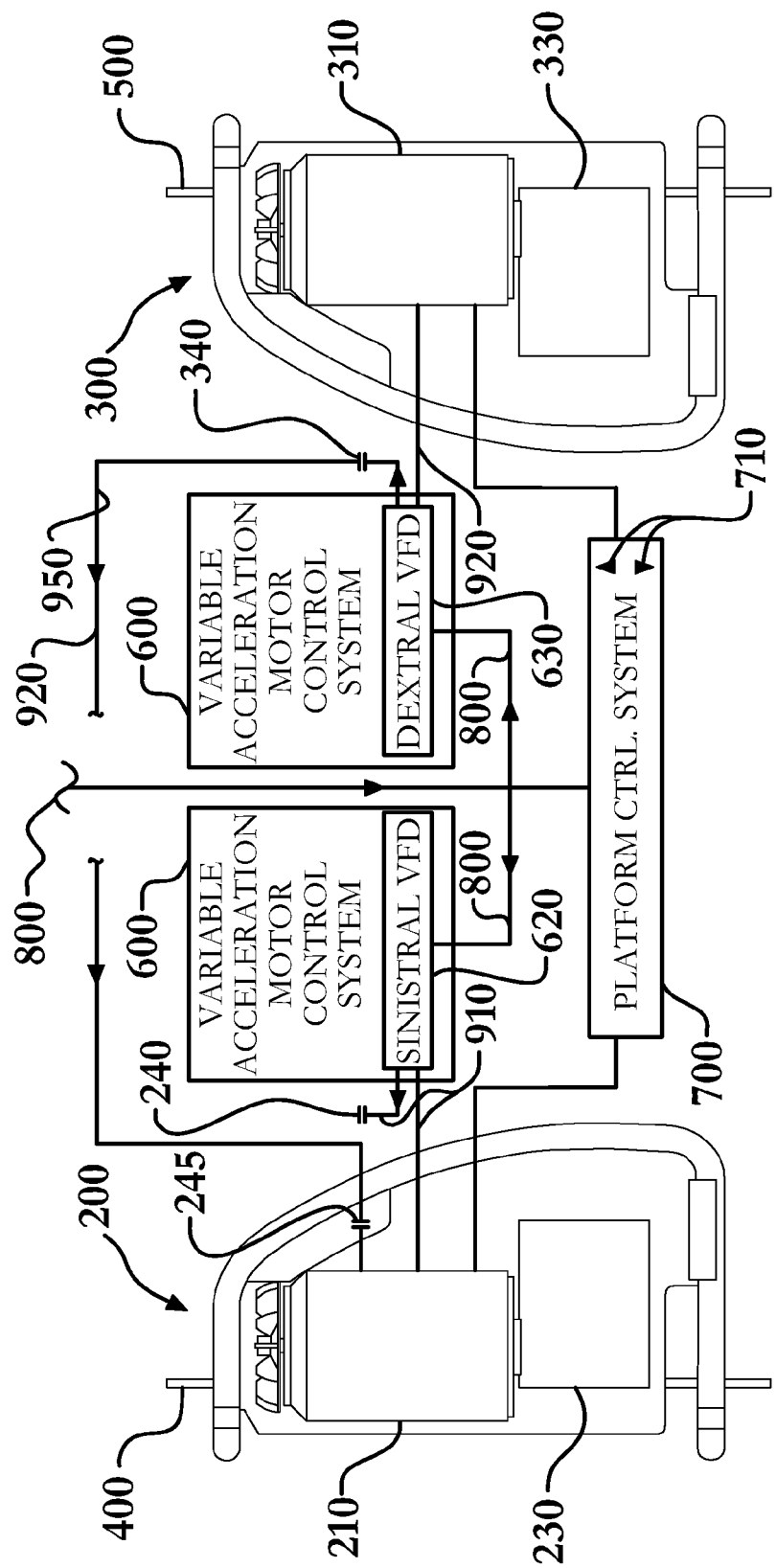
FIG. 9 is a schematic of an embodiment of the suspension work platform hoist system, not to scale.

Now, referring back to the embodiment of FIGS. 7-9 wherein each drive (620, 630) is sized to power both motors (210, 310), this embodiment is similar to the previously described embodiment of FIG. 2 wherein a single variable frequency drive (610) controls both motors (210, 310), yet the present embodiment introduces redundant capabilities not previously seen. In this embodiment the constant frequency input power source (800) is in electrical communication with both the sinistral variable frequency drive (620), thereby producing a sinistral variable frequency power supply (910), and the dextral variable frequency drive (630), thereby producing a dextral variable frequency power supply (920). The sinistral variable frequency power supply (910) is in electrical communication with the sinistral motor (210) and a dextral output power terminal (240). Similarly, the dextral variable frequency power supply (920) is in electrical communication with the dextral motor (310) and a sinistral output power terminal (340).

Additionally, in this embodiment the sinistral motor (210) is also in electrical communication with a sinistral auxiliary input power terminal (245) and the dextral motor (310) is also in electrical communication with a dextral auxiliary input power terminal (345), as seen schematically in FIG. 7. Therefore, in the configuration of FIG. 8 the variable acceleration motor control system (600) utilizes the sinistral variable frequency drive (620) to control both the sinistral and dextral motors (210, 310), thereby requiring that the dextral output power terminal (240) be in electrical communication with the dextral auxiliary input power terminal (345) via an auxiliary conductor (950). In the alternative configuration of FIG. 9 the variable acceleration motor control system (600) utilizes the dextral variable frequency drive (620) to control both the sinistral and dextral motors (210, 310), thereby requiring that the sinistral output power terminal (340) be in electrical communication with the sinistral auxiliary input power terminal (245) via an auxiliary conductor (950). The auxiliary conductor (950) may be a set of loose conductors or the conductors may be permanently attached to the work platform (100). These embodiments provide the hoist system (10) with a field configurable redundant output power supply capable of controlling the acceleration of the work platform (100) upon failure of either the sinistral variable frequency drive (620) or the dextral variable frequency drive (630).

A further variation of the above embodiment incorporates an alternator that ensures that each time the work platform (100) starts, the opposite variable frequency drive (620, 630) supplies the variable frequency power supply to both motors (210, 310). Alternatively, the alternator may cycle the variable frequency drives (620, 630) based upon the amount of operating time of the drives (620, 630). These embodiments ensure substantially equal wear and tear on the variable frequency drives (620, 630). Still further, the system (10) may incorporate an automatic changeover features so that if one variable frequency drive (620, 630) fails then the other variable frequency drive (620, 630) automatically takes over. As an additional safety measure, the variable frequency drives (610, 620, 630) may incorporate a bypass switch allowing the constant frequency input power source to be directly supplied to the sinistral motor (210) and the dextral motor (310), thereby permitting the variable frequency drives (610, 620, 630) to serve as across-the-line motor starters.

Another embodiment incorporates an enclosure, or enclosures, for the hoist components thereby improving the operating safety, equipment life, serviceability, and overall ruggedness. For instance, in one embodiment, seen in FIG. 15, the sinistral motor (210), the sinistral traction mechanism (220), and the sinistral gearbox (230), seen in FIG. 14, are totally enclosed in a sinistral housing (250) attached to a sinistral chassis (260). Similarly, the dextral motor (310), the dextral traction mechanism (320), and the dextral gearbox (330) may be totally enclosed in a dextral housing (350) attached to a dextral chassis (360). Further, with reference now to FIG. 14, the sinistral chassis (260) may include a sinistral handle (262) and at least one rotably mounted sinistral roller (264) configured such that the sinistral hoist (200) pivots about the sinistral roller (264) when the sinistral handle (262) is acted upon, so that the sinistral hoist (200) may be easily transported via rolling motion. Similarly, the dextral chassis (360) may include a dextral handle (362) and at least one rotably mounted dextral roller (364) configured such that the dextral hoist (300) pivots about the dextral roller (364) when the dextral handle (362) is acted upon, so that the dextral hoist (300) may be easily transported via rolling motion. Further, it is often desirable to have very compact hoists (200, 300) so that they may fit through small opening in confined spaces to carry out work. One such occasion is when performing work on the inside of an industrial boiler wherein the access hatches are generally eighteen inches in diameter. Therefore, in one embodiment, seen in FIGS. 14-15, the sinistral hoist (200), sinistral housing (250), and sinistral chassis (260) are configured to pass through an eighteen inch diameter opening and the dextral hoist (300), dextral housing (350), and dextral chassis (360) are configured to pass through an eighteen inch diameter opening, while having a weight of less than 120 pounds.

As previously mentioned, the variable acceleration motor control system (600) is releasably attached to the moving work platform (100). In the embodiments incorporating variable frequency drives (610, 620, 630) and hoist housings (250, 350), the variable frequency drives (610, 620, 630) are most commonly mounted within one, or more, of the hoist housings (250, 350). In fact, in a preferred embodiment the sinistral hoist (200) has its own sinistral variable frequency drive (620) housed within the sinistral hoist housing (250), and similarly the dextral hoist (300) has its own dextral variable frequency drive (630) housed within the dextral hoist housing (350). In such an embodiment, seen in FIG. 15, it is also ideal to have the dextral power terminal (240) as a dextral weather-tight conductor connector (242) located on the sinistral hoist (200), and the sinistral power terminal (340) as a sinistral weather-tight conductor connector (342) located on the dextral hoist (300). The weather-tight conductor connectors (242, 342) and power terminals (240, 340) may be any number of male, or female, industrial plugs and receptacles that cooperate with conductors sized to handle the electrical load of supplying power to either of the motors (210, 310).

In yet another embodiment, the variable acceleration motor control system (600) monitors the constant frequency input power source and blocks electrical communication to the sinistral motor (210) and the dextral motor (310) when the voltage of the constant frequency input power source varies from a predetermined voltage by more than plus, or minus, at least ten percent of the predetermined voltage. Further, the variable acceleration motor control system (600) may incorporate reporting devices to signal to an operator the reason that the system (600) has been shut down. The variable acceleration motor control system (600) may also monitor the load on the sinistral traction mechanism (220) and the dextral traction mechanism (320) and blocks electrical communication to the sinistral motor (210) and the dextral motor (310) if (a) either the sinistral traction mechanism (220) loses traction on the sinistral rope (400) or the dextral traction mechanism (320) loses traction on the dextral rope (500), (b) the load on the work platform (100) exceeds a predetermined value, or (c) the load on the work platform (100) is less than a predetermined value.

The platform control system (700) and the user input device (710) may incorporate functions other than merely accepting instructions to raise or lower the work platform (100). Generally the industry refers to the platform control system (700) as a central control box, which may include numerous buttons and switches, or user input devices (710), for controlling the suspension work platform hoist system (10). In one particular embodiment the platform control system (700) includes a pendant so that the operator does not need to be located at the user input device (710) to control the movement of the work platform (100). In other words, the user input device (710) may be at least one control switch, button, or toggle located on a fixed central control box, or it may be all, or some, of those same devices located on a movable pendent. Generally, the user input device (710) will include up/down hold-to-run switches, hoist selector switches (sinistral, dextral, both), and an emergency stop button. Various embodiments of the present invention may call for the addition of input devices associated with the variable acceleration motor control system (600). Such additional input devices may include (a) approach mode enable/disable, (b) adjustable approach velocity setpoint, (c) work mode enable/disable, (d) adjustable approach velocity setpoint, (e) adjustable acceleration period setpoint, and (f) hoist master/slave selector to identify which hoist generates the control power or control signal and which merely receives the power or control signal and responds accordingly. The platform control system (700) and/or the user input device (720) may incorporate a LCD screen to view diagnostics and setpoints. Further, the LCD screen may be a touch-screen input system.

Even further, the platform control system (700) may incorporate a diagnostic system (750), as seen in FIG. 1, that allows the user to perform specific tests of the system (10) and makes the user aware of certain conditions, and that performs a predetermined set of tests automatically. The diagnostic system (750) permits the user to initiate system tests, or checks, including testing the panel light integrity as well as the level of the input voltage. Further, the diagnostic system (750) may run automatic system tests including (a) ultra-high top limit detection, (b) tilt sensing in up to 4 axes, (c) ultra-bottom limit detection, (d) under load detection, (e) overload detection, (f) fall protection interlock integrity, or Sky Lock interlock integrity, (g) motor temperature, (h) brake voltage level, (i) rope jam sensing, (j) wire-winders integrity, (k) main voltage phase loss integrity, (l) end-of-rope sensing integrity, (m) digital speed read-out, (n) digital fault display, (o) rope diameter sensing integrity, and/or (p) platform height protector integrity. In other words, the diagnostic system (750) may run automatic tests to ensure that every safety feature is operational and properly functioning. The diagnostic system (750) automatic tests may be programmed to run every time the hoist is operated, or on an alternative schedule. The diagnostic system (750) may include any number of visual indicators (752), seen in FIG. 14, to alert the user of particular conditions. For instance, each of the above listed automatic tests may have a unique visual indicator (752) to inform the user whether the test was a success, or failure. The visual indicators (752) may be light emitting diodes, or LED's, LCD display such as 2×16, 2×20, or 2×40, or similar type readouts.

Another advantage of the present platform control system (700) is that it incorporates a printed circuit board (PCB), thereby offering functionality and flexibility not previously seen in hoist system. The PCB facilitates the easy incorporation of numerous optional features by simply plugging them into the appropriate ports on the PCB allowing an unprecedented degree of modularity. The control system software includes plug-and-play type features that automatically recognize new components plugged into the PCB. The substrate of the PCB is an insulating and non-flexible material. The thin wires are visible on the surface of the board are part of a copper foil that initially covered the whole board. In the manufacturing process the copper foil is partly etched away, and the remaining copper forms a network of thin wires. These wires are referred to as the conductor pattern and provide the electrical connections between the components mounted on the PCB. To fasten the modular components to the PCB the legs on the modular components are generally are soldered to the conductor pattern or mounted on the board with the use of a socket. The socket is soldered to the board while the component can be inserted and taken out of the socket without the use of solder. In one embodiment the socket is a ZIF (Zero Insertion Force) socket, thereby allowing the component to be inserted easily in place, and be removable. A lever on the side of the socket is used to fasten the component after it is inserted. If the optional feature to be incorporated requires its own PCB, it may connect to the main PCB using an edge connector. The edge connector consists of small uncovered pads of copper located along one side of the PCB. These copper pads are actually part of the conductor pattern on the PCB. The edge connector on one PCB is inserted into a matching connector (often referred to as a Slot) on the other PCB. The modular components mentioned in this paragraph may include a GPS tracking device (720) and a wireless receiver (740), just to name a few.

The platform control system (700) may further include a GPS tracking device (720), shown schematically in FIG. 1. The GPS tracking device (720) allows the owner of the suspension work platform hoist system (10) to track its location real-time. The GPS tracking device (720) may be a battery powered 12, or more, channel GPS system capable of up to 120 days of operation based upon 10 reports a day, powered by 6 AA alkaline batteries or 6-40 VDC. The GPS tracking device (720) has an internal antenna and memory to record transmissions when cellular service is poor or lost. The GPS tracking device (720) may be motion activated. The GPS tracking device (720) may be manufactured by UTrak, Inc., a Miniature Covert GPS Tracking System Item#: SVGPS100, a RigTracker tracking system, or a Laipac Technology, Inc. tracking system, just to name a few.

Further, still referring to FIG. 1, the platform control system (700) may include a remote wireless transmitter (730) and a receiver (740) wherein the remote wireless transmitter (730) transmits commands to the receiver (740) using spread spectrum communications. The remote wireless transmitter (730) may include some, or all, of the controls of the user input device(s) (710) discussed herein. The spread spectrum communications may utilize digital frequency hopping or analog continuous frequency variation, generally on 900 MHz to 2.4 GHz carrier frequencies. Additionally, the remote wireless transmitter (730) is capable of transmitting commands to the receiver (740) with a range of at least one thousand feet, and up to three thousand feet. Spread spectrum communications are less susceptible to interference, interception, exploitation, and spoofing than conventional wireless signals. This is important due to the safety concerns associated with controlling a suspended work platform (100) from a remote location. The spread spectrum communication system varies the frequency of the transmitted signal over a large segment of the electromagnetic radiation spectrum, often referred to as noise-like signals. The frequency variation may be accomplished according to a specific, but complicated, mathematical function often referred to as spreading codes, pseudo-random codes, or pseudo-noise codes. The transmitted frequency changes abruptly many times each second. The spread spectrum signals transmit at a much lower spectral power density (Watts per Hertz) than narrowband transmitters.

In yet another embodiment, the suspension work platform hoist system (10) includes elements to reduce the reactive power associated with conventional suspended hoist systems and produce a hoist system power factor of at least 0.95 when operating at a steady state full-load condition as the motor (210) raises the work platform (100) on the rope (400). The hoist system power factor takes into account all the power consuming devices of the suspension work platform hoist system (10) as well as a suspended conductor system (810) that connects the constant frequency input power source (800) to the hoist (200), which is often in excess of several hundred feet. A further embodiment achieves a hoist system power factor of at least 0.98 when operating at a steady state full-load condition.

In one embodiment, the hoist system power factor is achieved by incorporating a reactive power reducing input power system (1300) into the suspension work platform hoist system (10). As seen schematically in FIG. 26, in one embodiment the reactive power reducing input power system (1300) includes an AC-DC converter (640) and a regulator system (650), wherein the regulator system (650) is in electrical communication with a DC-AC inverter (670) that is in electrical communication with the motor (210). The DC-AC inverter (670) controls the rate at which the motor (210) accelerates the traction mechanism (220) thereby controlling the acceleration of the work platform (100) as the work platform (100) is raised and lowered on the rope (400).

In yet another embodiment, the reactive power reducing input power system (1300) accepts input voltages from single phase 200 VAC to three phase 480 VAC, and the regulator system (650) includes a buck regulator topology generating direct current voltage supply of less than 330 VDC to the DC-AC inverter (670). An even further embodiment incorporates a toroidal stack having an inductance of at least 2 millihenry in the buck regulator topology. The toroidal stack provides a stabilized inductance at a fairly high current, over a wide range of voltages. Alternatively, the reactive power reducing input power system (1300) may accept a single phase voltage, and the regulator system (650) may include a boost regulator topology generating direct current voltage supply of less than 330 VDC to the DC-AC inverter (670), wherein the boost regulator has an inductance of at least 3 millihenry. In this single phase embodiment, the high hoist system power factor, combined with the boost regulator topology, produces an adequate power supply to the DC-AC inverter (670) for operation of the motor (210) even when input power to the reactive power reducing input power system (1300) is between 85 VAC and 95 VAC, thereby eliminating the need for external boost transformers that are often required in suspended work platform applications due to large reactive power requirements associated with the induction machines that are used as hoist motors, and the excessive voltage drops common in suspended work platform applications where it is common for the suspended conductor system (810) to extend a great distance between the constant frequency input power source (800) and the hoist (200).

In one embodiment the reactive power reducing input power system (1300) utilizes a single active switch and a control algorithm that senses the rectified input voltage to facilitate the regulator system (650) drawing current such that the current and voltage from the constant frequency input power source (800) are substantially in phase, resulting in the high hoist system power factor. Further, in this embodiment the regulator system (650) is configured to facilitate a fail safe mode such that if the DC-AC inverter (670) fails the resulting circuit is simply a 3-phase rectifier and an LC filter. Further, utilizing a single active switch is significantly less costly than traditional methods such as six active switch PFC input or a Vienna Rectifier approach.

Utilization of a regulator system (650) incorporating a boost regulator topology, or buck regulator topology, to generate direct current voltage supply of less than 330 VDC to the DC-AC inverter (670), in conjunction with a standard three phase rectifier to achieve power factor correction, enables the electronic load to appear as a resistor to the constant frequency input power source (800). This is particularly important as the kVA rating of motor (210) goes up. Regardless of topology, the following fundamental relationships remain true. Apparent power is a complex vector. Average power is the real component, and reactive power is the complex component of this vector.

$$S = P + j \times Q$$

S is the apparent power in VA, P is the average power in Watts, and Q is the reactive power in VARS. Power factor is defined as:

$$PF = \frac{P}{|S|}$$

The above equation holds true for instants in time, where P and S may have numerous harmonics integrated into them. If one considers another definition of power:

$$P = V \times I \times \cos(\theta)$$

The above is the real power as a function of V, I, and the fundamental displacement power factor, i.e. the power factor associate with the fundamental frequency of V and I. A more complete way to look at power factor is:

$$PF = HF \times DF$$

which says that power factor is the product of the Harmonic Factor and the Displacement Power Factor. Finally, Harmonic Factor is determined by:

$$HF = \frac{1}{(1 + THD^2)}$$

In order to ascertain the performance advantage to a building's electrical system, and consequently the electrical power grid, mathematical analysis is undertaken to quantitatively indicate the performance advantage (i.e. reduced transmission line losses and reduced power generation required at the source). Consider the induction machine, with the Thevenin impedance at the terminals given by:

$$Z_{machine} = R + j\omega L$$

The real power absorbed by the machine is:

$$P_{machine} = (I_{machine})^2 \times R$$

The real power absorbed by the machine is:

$$Q_{machine} = (I_{machine})^2 \times \omega \times L$$

An optimal case for the building electrical power system occurs when the term of Qmachine approaches 0, because the apparent power (S) is reduced to solely active power (P) and the currents supplied to the induction machine will be minimum.

A reasonable power factor for a lower power induction machine is on the order of 0.7 to 0.8. Using a power factor of 0.7, one can determine how much reactive power is consumed for a 3.0 HP induction machine, in conjunction with the typical acceptable value for converting between HP and Watts. Consider, for example:

$$P_{machine} = 0.746 \times \frac{\text{Watts}}{\text{HP}} \times 3.0 \text{ HP} = 2.238 \text{ KW}$$

Now calculating how much reactive power the machine would draw:

$$S_{machine} = \frac{P_{machine}}{PF} = \frac{2238}{.7} = 3.2 \text{ kVA}$$

Now consider how much current would be needed by the machine in the case of the 0.8 lagging power factor:

$$I_{building} = \frac{S_{lagging_{pf}}}{V_{rms} \times \sqrt{3}} = \frac{3.2 \text{ kVA}}{230 \text{ V} \times 1.732} = 8.03 \text{ Amps}$$

Now consider how much current would be needed by the machine in the case of a unity power factor case:

$$I_{building^*} = \frac{S_{unity_{pf}}}{V_{rms} \times \sqrt{3}} = \frac{2.24 \text{ kW}}{230V \times 1.732} = 5.62 \text{ Amps}$$

Now, consider a suspended hoist application utilizing a suspended conductor system (810) of 12 AWG, having a resistance of:

$$R_{cable_{12AWG}} = \frac{1.588 \Omega}{1,000 \text{ feet}}$$

Now, assuming that the length of the current path in the suspended conductor system (810) is 1000 feet, the total resistance is 1.588. Now calculating the transmission line power losses for the 0.8 lagging power factor example:

$$P_{cable} = (8.03 \text{ Amps})^2 \times 1.588 \Omega = 102.4 \text{ W}$$

The transmission line power losses for the unity power factor example:

$$P_{cable} = (5.62 \text{ Amps})^2 \times 1.588 \Omega = 50.15 \text{ W}$$

Thus the power losses are more than double in the case of a non-unity power factor corrected system. Further, the power losses in the transmission line at non-unity power factor are non-trivial; after all, 100 Watts of power loss contributes to voltage drop at the motor terminals. Consider the voltage drop:

$$V_{drop} = 8.03\ \text{Amps} \times 1.588\ \Omega = 12.75\ \text{V}$$

Thus, the reactive power reducing input power system (1300) produces power factor correction resulting in reduced voltage drop at the motor terminals, reduced transmission line power losses which will often eliminate the need for an external boost transformer in suspended work platform applications, reduced power generation requirement of the building electrical system, and reduced power generation requirement of the grid supplying the building electrical system.

Now, referring back to the embodiment in which the reactive power reducing input power system (1300) accepts input voltages from single phase 200 VAC to three phase 480 VAC; one further specific embodiment incorporates the regulator system (650) in a buck regulator topology generating direct current voltage supply of less than 330 VDC to the DC-AC inverter (670) such that the constant frequency input power source (800) may be single phase 230 VAC, or three phase 230 VAC, 380 VAC, or 480 VAC. Controlling the DC voltage to the DC-AC inverter (670) to 330 VDC or less facilitates the use of an inverter (670) having a rating of 600 V or less, instead of 1200 V rated IGBT's that are common in inverters. Yet another embodiment utilizes a reactive power reducing input power system (1300) with the regulator system (650) in a buck regulator topology generating direct current voltage supply of less than 300 VDC to the DC-AC inverter (670); while yet a further embodiment generates a direct current voltage supply of less than 275 VDC to the DC-AC inverter (670).

Figure 25:
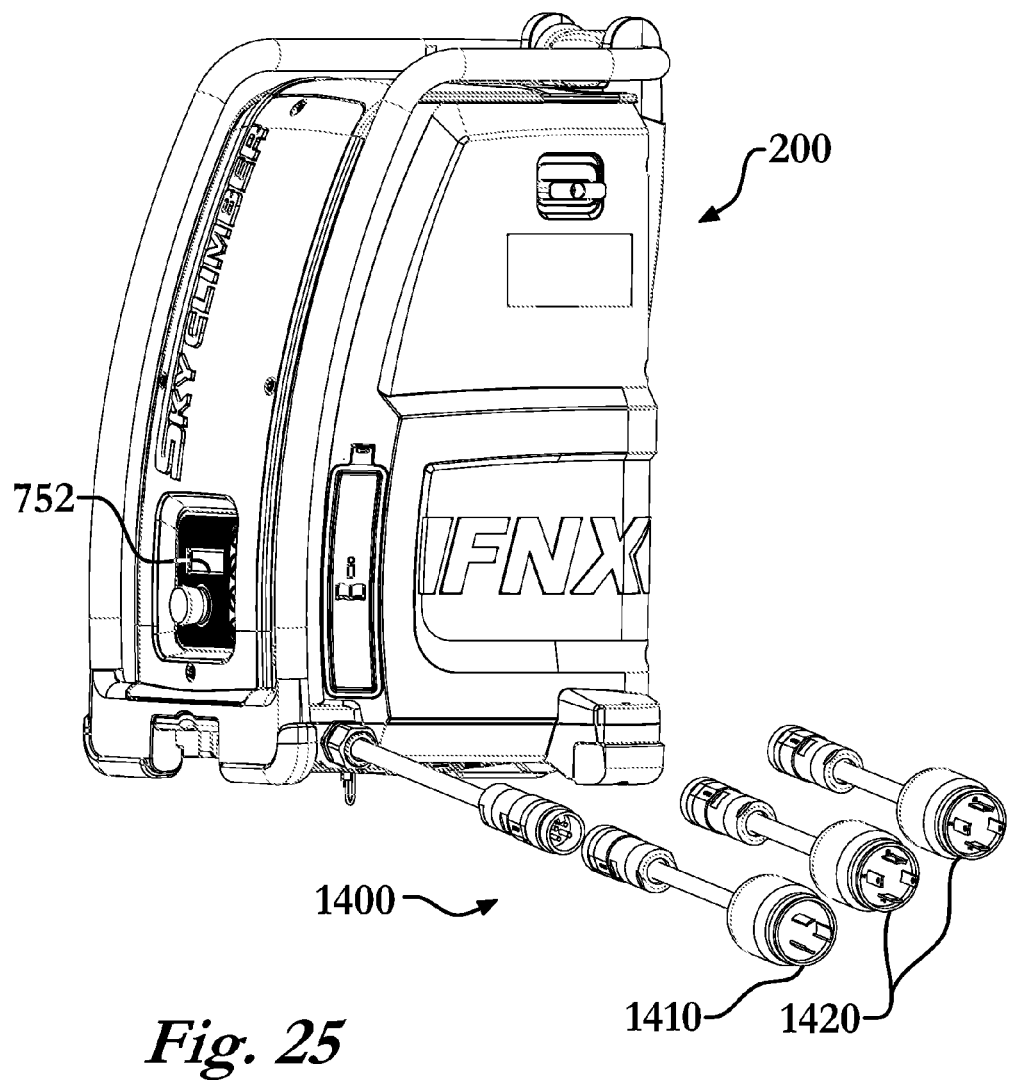
FIG. 25 is a perspective view of an embodiment of the hoist, not to scale.

The unique configuration of the reactive power reducing input power system (1300) and DC-AC inverter (670) facilitates such a wide range of acceptable input power supplies that one embodiment of the hoist (200) incorporates a multiple input power connection system (1400) including at least one single phase power connector (1410) and at least one three phase power connector (1420), as seen in FIG. 25. Such a configuration allows a user to simply connect the appropriate power connector (1410, 1420) to correspond to the job site, while utilizing the same hoist (200). This feature is particularly beneficial to equipment rental businesses that rent hoists to contractors. For example, the equipment rental business would now have one hoist (200) that works with at least four different input power situations (single phase 230 VAC, or three phase 230 VAC, 380 VAC, or 480 VAC) simply by connecting an appropriate single phase power connector (1410) or three phase power connector (1420); eliminating the need to stock a specific hoist for each anticipated power situation, which results in wasted space, inventory, and a lot of idle time.

In one embodiment the location and packaging of the reactive power reducing input power system (1300) and the DC-AC inverter (670) are within the hoist (200), meaning within the housing illustrated in FIG. 25. In this embodiment the reactive power reducing input power system (1300) and the DC-AC inverter (670) occupy a volume in cubic inches that is less than three times the weight of the hoist (200) in pounds. This relationship balances the effect that generally lightweight but high volume consuming electronics have on the center of gravity of the hoist (200) which has a much higher density, as well as the overall size of the hoist (200). For example, in one embodiment the total weight of the hoist (200), seen in FIGS. 14-15, is less than 110 pounds, and the total volume occupied by the reactive power reducing input power system (1300) and the DC-AC inverter (670) is less than 330 cubic inches. In a further embodiment, the reactive power reducing input power system (1300) and the DC-AC inverter (670) are housed in separate compartments within the hoist (200) to better allocate these lightweight regions. In fact, in this embodiment the reactive power reducing input power system (1300) occupies a volume in cubic inches that is less than 1.5 times the weight of the hoist (200) in pounds, and the DC-AC inverter (670) occupies a second volume in cubic inches that is less than 1.3 times the weight of the hoist (200) in pounds.

Referring again to FIGS. 26-27, another embodiment further including an isolation system (680) that electrically isolates the DC-AC inverter (270) from the motor (210) when the DC-AC inverter (270) is not transmitting power to the motor (210). The isolation system (680) prevents any current generated by the rotation of the motor (210) during an unpowered descent of the work platform from coming in contact with the DC-AC inverter (270).

Yet a further embodiment includes a descent control system (690) between the isolation system (680) and the motor (210), wherein in an emergency descent mode the descent control system (690) electromagnetically controls the emergency descent of the work platform (100) under the influence of gravity and limits the emergency descent velocity to 60 feet per minute, and more preferably limits the emergency descent velocity to 45 feet per minute or less. If utility power is lost the work platform (100) is locked by a mechanical brake and remains suspended in the air for the operators' safety. If this happens, the mechanical brake may be released manually to enter the emergency descent mode and to allow the work platform (100) to descend to the ground at the emergency descent velocity.

Figure 26:
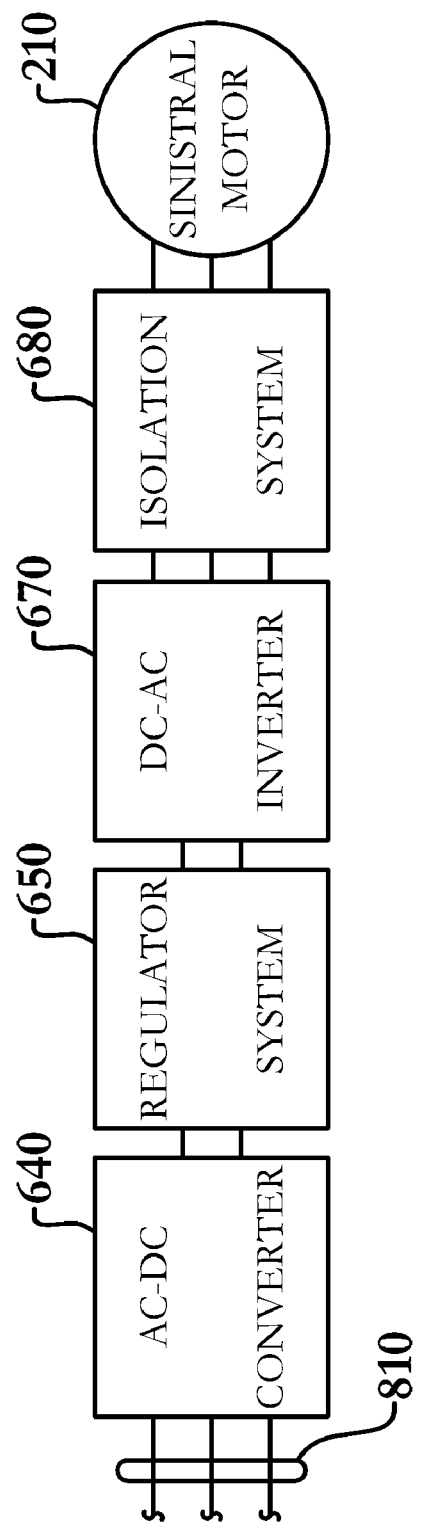
FIG. 26 is a partial schematic view of an embodiment the suspension work platform hoist system, not to scale.
Figure 27:
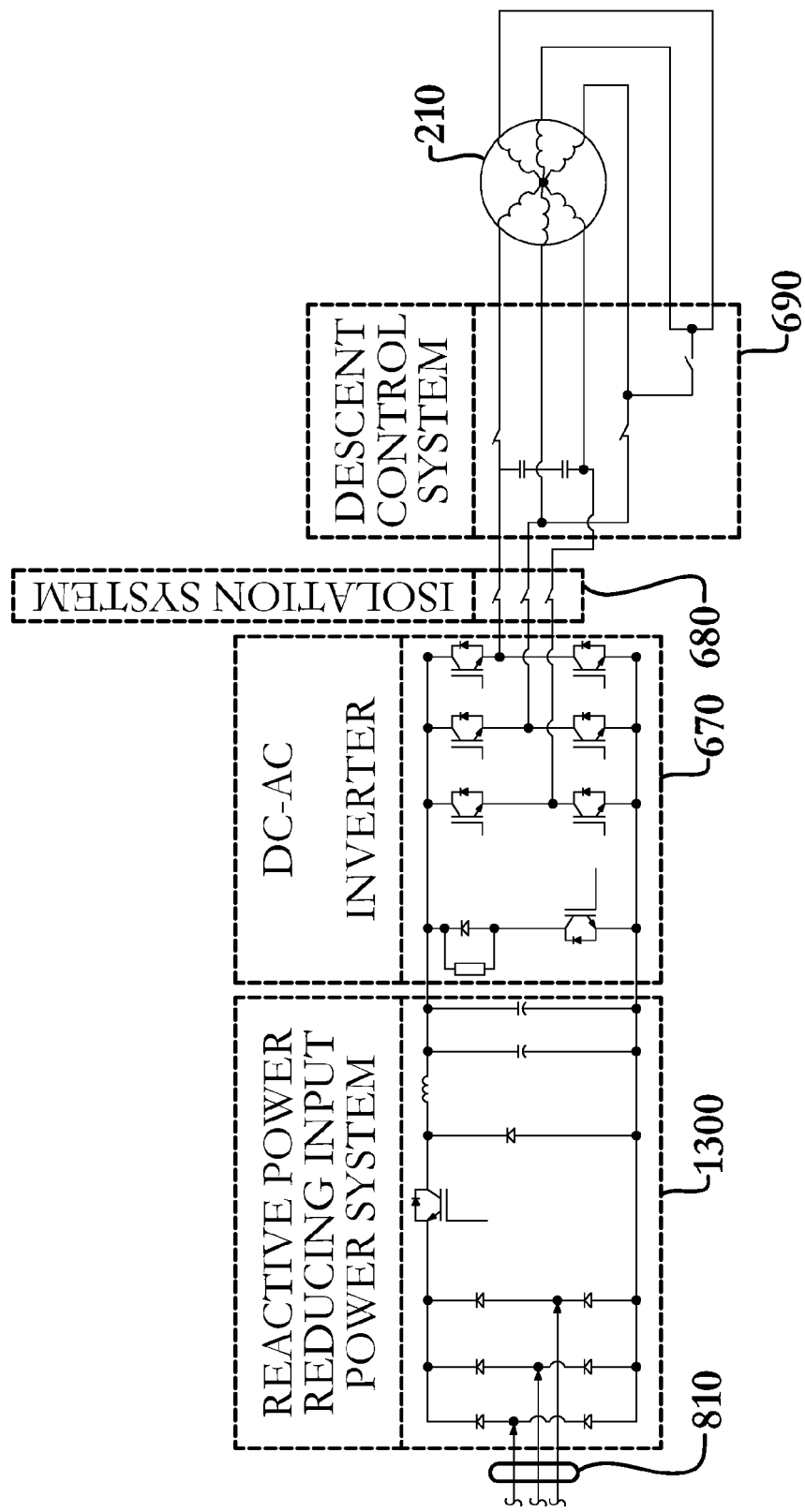
FIG. 27 is a partial schematic view of an embodiment the suspension work platform hoist system, not to scale.

In this embodiment, when the platform descends, the DC-AC inverter (270) is isolated from the induction machine by the isolation system (680), seen in FIGS. 26 and 27, and the machine works as an independent system having a generator with capacitors. The motor (210) generates an AC voltage across its terminals because of the interaction between the rotation of the rotor and the residual magnetism. In a further embodiment, the descent control system (690) creates a descent circuit connected to two terminals of the motor (210) and contains at least one descent capacitor thereby allowing the motor (210) to function as a generator creating a descent voltage of 100 VAC to 400 VAC across the at least one descent capacitor. The at least one descent capacitor helps to conduct the current flow through the rotor coils such that the rotor can keep rotating as the normal operation because of the electromagnetic torque. In an even further embodiment, the descent control system (690) electromagnetically controls the emergency descent of the work platform (100) under the influence of gravity and limits the emergency descent velocity to 35 feet per minute. The isolation system (680) also separates the at least one descent capacitor from the reactive power reducing input power system (1300) and the DC-AC inverter (270), thereby eliminating those components from influencing the impedance in the descent circuit.

As previously mentioned, the suspension work platform hoist system (10) may include a platform control system (700), which is often referred to in the industry as a central control box (CCB). In one such embodiment the suspension work platform hoist system (10) may include one reactive power reducing input power system (1300) supplying power to multiple DC-AC inverters (270), which may include a dedicated DC-AC inverter (270) for each hoist (200, 300), and optionally may include auxiliary wire winders, trolleys, etc. In essence, powering the major power consuming devices from one common DC bus further introduces the benefit of a near unity power factor for substantially all of the electrical load associated with the operation of the suspension work platform hoist system (10) and related auxiliaries. Obviously, the electrical load in this case would be increased due to the auxiliaries such as wire winders, trolleys, etc. and therefore the benefits of a near unity power factor would take on added significance. In fact, in one such embodiment the common reactive power reducing input power system (1300) supplies a load of at least 5 kW with the hoist system power factor of at least 0.95, versus supplying a 2-3 kW load as would be the case with two or three hoists, as is common in many suspended work platform situations. Additionally, the use of one reactive power reducing input power system (1300) to supply power to multiple DC-AC inverters (270) increases reliability and reduces costs for the overall system, and enables greater control of the hoists by having the controls located in a common central location. Further, diagnostic and prognostic functions are enhanced and allow immediate discernment by the operator as to whether a faulted or dangerous condition with the hoist exists.

In yet another embodiment, the hoist system (10) is a constant acceleration hoist system and the reactive power reducing input power system (1300) includes a capacitor bank adjacent the motor (210) to achieve the hoist system power factor of at least 0.95 in steady state full-load condition as the motor (210) raises the work platform (100) on the rope (400). The following example is an illustration of this capacitor bank embodiment. For convenience, this analysis assumes the use of a 1-hp motor. Many applications using a low-horsepower electric motor will be fed by a #12-gauge cable and protected at a load center (main panel), the constant frequency input power source (800), by a 20-A circuit breaker. For this analysis, the suspended conductor system (810) includes an average two-conductor cable length from the load center to the hoist (200) containing the electric motor (210) that is at least 50 feet from the main panel to the hoist (200), for a total length of 100 feet, significantly less than the average suspended work platform application. Additionally, this example assumes, for the purposes of illustration only, that the motor (210) is a 1-hp motor with a 85% efficiency and a lagging power factor of 0.75.

Power-factor analysis of the power delivered to a single-phase, 1-hp electric motor (210) fed by a 120-V electric circuit requires a knowledge of motor (210) and cable, suspended conductor system (810), characteristics. In this particular example, the suspended conductor system (810) is assumed to be a 50 foot long section of #12-gauge Romex cable.

The first task is to determine the resistance of 100 feet of cable (resistance of both the hot and neutral wires). The resistance of #12-gauge wire is 1.588Ω/1,000 feet, so Rcable=1.588Ω/1,000 ft×100 feet=0.1588Ω.

The electrical equivalent of an electric motor can be symbolized as an inductive reactance in series with a resistance. The inductive reactance is due to the stator inductance and reflected inductance of the rotor. The resistance is caused by wire resistance (both stator and reflected resistance of the rotor) combined with losses due to hysteresis and eddy currents, mechanical resistances such as bearing losses, and windage.

The power factor is defined as the real power divided by the apparent power of a system. In this case, assuming a motor has an internal resistance of 8Ω and an inductive reactance of j6. The total impedance of the motor would be:

$$\overline{Z_{MOTOR}} = 8+j6 = 10\angle 36.86989°$$

The real power of the motor is determined by the square of the amperage times the motor's internal resistance.

$$RP_{MOTOR} = I^2 \times R_{MOTOR}$$

The apparent power of the motor is determined by the square of the amperage time the motor's total impedance.

$$AP_{MOTOR} = I^2 \times \overline{Z_{MOTOR}}$$

Therefore:

$$PF_{MOTOR} = \frac{RP_{MOTOR}}{AP_{MOTOR}} = \frac{I^2 \times R_{MOTOR}}{I^2 \times \overline{Z_{MOTOR}}} = \frac{R_{MOTOR}}{\overline{Z_{MOTOR}}} = \frac{8\Omega}{10\angle 36.86989°\Omega}$$

$PF_{MOTOR} = 0.8$

Then:

$$R_{TOTAL} = .1588\Omega_{CABLE} + 8\Omega_{MOTOR} = 8.1588\Omega$$

$$\overline{Z_{TOTAL}} = \overline{Z_{CABLE}} + \overline{Z_{MOTOR}} = 0.1588 + j0 + 8 + j6 = 10.127\angle 36.33°\Omega$$

$$PF_{SYSTEM} = \frac{RP_{TOTAL}}{AP_{TOTAL}} = \frac{I^2 \times R_{TOTAL}}{I^2 \times \overline{Z_{TOTAL}}} = \frac{R_{TOTAL}}{\overline{Z_{TOTAL}}} = \frac{8.1588\Omega}{10.127\angle 36.33°\Omega}$$

$$PF_{SYSTEM} = 0.8056$$

Due to cable resistance, the full 120 V is not applied to the motor, rather by the voltage divider rule:

$$\overline{V_{MOTOR}} = \overline{V_{SOURCE}} \times \frac{\overline{Z_{MOTOR}}}{\overline{Z_{TOTAL}}} = 120\angle 0° \times \frac{8+j6}{0.1588+8+j6} = 118.489\angle 0.54°$$

The power delivered to the system is:

$$P_{IN\ SYSTEM} = |\overline{E}| \times |\overline{I}| \times \cos\theta = 120 \times 11.8945 \times \cos(36.33°) = 1145.52\ W$$

The power delivered to the motor is:

$$P_{IN\ MOTOR} = |\overline{V_{MOTOR}}| \times |\overline{I}| \times \cos\theta = 118.489 \times 11.8495 \times \cos(36.86989°) = 1123.23\ W$$

Assuming a 75% motor efficiency:

$$P_{OUT} = P_{IN} \times \text{Efficiency} = 1123.23 \times 0.75 = 842.42\ W$$

$$P_{OUT}\ (hp) = P_{OUT}\ (watts) \times \frac{1\ hp}{746.7\ W} = \frac{842.42}{746.7} = 1.128\ hp$$

Now, introducing the reactive power reducing input power system (1300) does not affect the power factor of the motor, rather it only corrects the power factor that the cable plus load presents to the constant frequency input power source (800). Thus, performing the above computations but with the system load only represented by a resistance:

$$\overline{Z_{MOTOR}} = 8+j6 = 10\angle 36.86989°$$

Then, selecting a capacitor bank having a capacitive reactance equal to 16.6667Ω, $$\overline{Z_{TOTAL}} = \overline{Z_{CABLE}} + \overline{Z_{MOTOR}} = 0.1588 + j0 + 12.5 + j0 = 12.6588 + j0 = 12.6588\angle 0°$$

Calculating the value of the electrical current feeding the suspended conductor system (810) yields:

$$I_{TOTAL} = \frac{\overline{E}}{\overline{Z_{TOTAL}}} = \frac{120\angle 0°}{12.6588\angle 0°} = 9.47957\angle 0°$$

Now, assuming for the present example that the reactive power reducing input power system (1300) produces a system power factor of unity, the $PF_{SYSTEM}=1.0$. Due to the cable resistance, the full 120 V would not be applied to the motor. By the voltage divider rule:

$$\overline{V_{MOTOR}} = \overline{V_{SOURCE}} \times \frac{\overline{Z_{MOTOR}}}{\overline{Z_{TOTAL}}} = 120\angle 0° \times \frac{12.5\angle 0°}{0.1588+12.5} = 118.495\angle 0°$$

The power delivered to the system is:

$$P_{IN\,SYSTEM} = |\overline{E}| \times |\overline{I}| \times \cos\theta = 120 \times 9.47957 \times \cos(0°) = 1137.55\ W$$

The power delivered to the motor is:

$$P_{IN\,MOTOR} = |\overline{V_{MOTOR}}| \times |\overline{I}| \times \cos\theta = 118.489 \times 9.47957 \times \cos(0°) = 1123.28\ W$$

Assuming a 75% motor efficiency:

$$P_{OUT} = P_{IN} \times \text{Efficiency} = 1123.28 \times 0.75 = 842.46\ W$$

$$P_{OUT}\ (hp) = P_{OUT}\ (watts) \times \frac{1\ hp}{746.7\ W} = \frac{842.46}{746.7} = 1.128\ hp$$

The reactive power reducing input power system (1300) only affects the transmission-line losses (the PF of the motor is an inherent characteristic of the motor), so the power savings due to the introduction of the reactive power reducing input power system (1300) can be determined. In this example, without the reactive power reducing input power system (1300), $P=I^2 R_{CABLE}=(11.85)^2 \times 0.1588=22.3$ W, whereas after the introduction of the reactive power reducing input power system (1300) the power loss associated with the suspended conductor system (810) is $P=I^2 R_{CABLE}=(9.48)^2 \times 0.1588=14.7$ W, which is a 34% reduction in power dissipated in the suspended conductor system (810), and this simplified example utilized a much shorter current path than the average suspended work platform application. Thus, in one embodiment the reactive power reducing input power system (1300) produces a system in which the power loss in the suspended conductor system (810) is less than 0.3 W per linear foot of length of the suspended conductor system (810) from the constant frequency input power source (800).

The constant acceleration hoist system embodiment described above having the reactive power reducing input power system (1300) that includes a capacitor bank adjacent the motor (210), may also include a descent control system (690), as previously described above, wherein in an emergency descent mode the descent control system (690) electromagnetically controls the emergency descent of the work platform (100) under the influence of gravity and limits the emergency descent velocity to 60 feet per minute. Still further, the descent control system (690) may create a descent circuit connected to two terminals of the motor (210) and contains at least one descent capacitor thereby allowing the motor (210) to function as a generator creating a descent voltage of 100 VAC to 400 VAC across the at least one descent capacitor. The configuration of FIG. 27 illustrates two descent capacitors. Even further, the descent control system (690) may electromagnetically control the emergency descent of the work platform (100) under the influence of gravity and limit the emergency descent velocity to 35 feet per minute. The basic theory is that the residual magnetic field on the rotor structure of the induction machine, i.e. motor (210), resonates with the at least one descent capacitor and the induction machine transitions to generator mode as an external mechanical prime mover, namely the gravitational weight of the suspended work platform (100) translated to a torque on the shaft of the motor (210), actuates the rotor.

One particular embodiment incorporates a descent capacitor having a capacitance of at least 60 µF to maintain the voltage generated in the descent circuit at less than 400 VAC and a current of less than 20 Amps, while controlling the descent of a 1200 pound load at less than 45 feet per minute. In yet another embodiment, a descent capacitor having a capacitance of at least 150 µF is incorporated to maintain the voltage generated in the descent circuit at less than 300 VAC and a current of less than 10 Amps, while controlling the descent of a 1200 pound load at less than 35 feet per minute. A further embodiment has recognized a unique relationship among variables necessary to provide a descent circuit with the desired control over a 1200 pound load; namely, the descent circuit should have at least one descent capacitor with a capacitance in µF of at least 2.5 times the desired descent velocity in feet per minute. Yet another embodiment recognizes another unique relationship among variables necessary to provide a descent circuit with the desired control over a 1200 pound load; namely, the descent circuit should have at least one descent capacitor with a maximum capacitance in µF of no more than at least 10 times the desired descent velocity in feet per minute.

Figure 17:
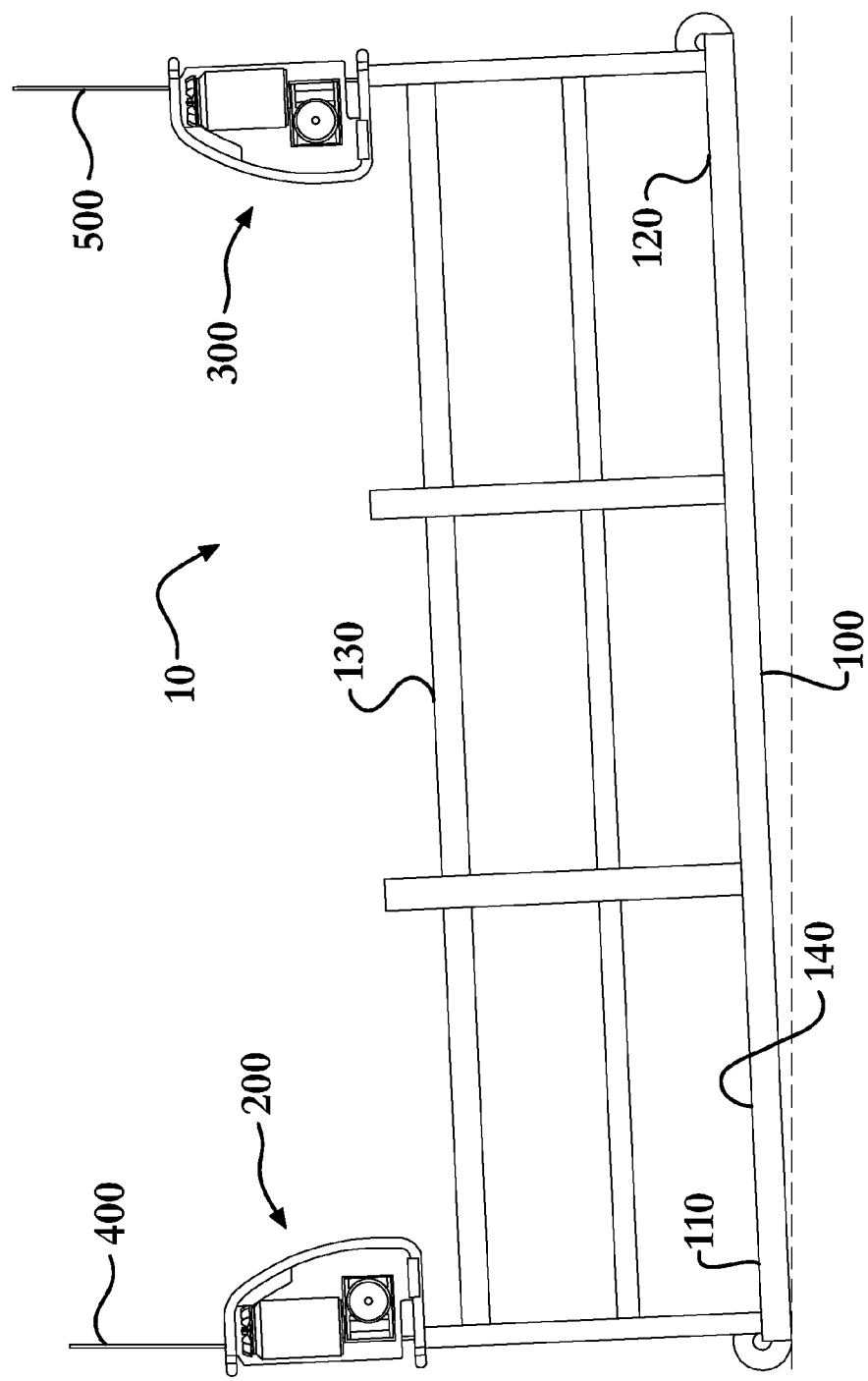
FIG. 17 is a front elevation view of an embodiment of a work platform of the suspension work platform hoist system, not to scale.

Referring generally now to FIGS. 18-24, the suspension work platform hoist system (10) may further include a tilt control system (1000). In one embodiment, the tilt control system (1000) is configured so that the work platform (100) reaches and maintains a substantially horizontal orientation as the work platform (100) is raised and lowered. In an alternative embodiment, the tilt control system (1000) allows the work platform (100) to reach and maintain a user specified tilt angle setpoint as the work platform (100) is raised and lowered. For example, the tilt angle setpoint may be set at a 0° tilt angle so that the work platform (100) maintains a substantially horizontal orientation when the work platform (100) is raised and lowered, or the tilt angle setpoint may be set at a non-zero tilt angle so that the work platform (100) maintains the non-zero tilt angle when the work platform (100) is raised and lowered, as illustrated in FIG. 17. It should be noted that the tilt control system (1000) may be incorporated into any of the previously discussed embodiments of the suspension work platform hoist system (10).

Figure 18:
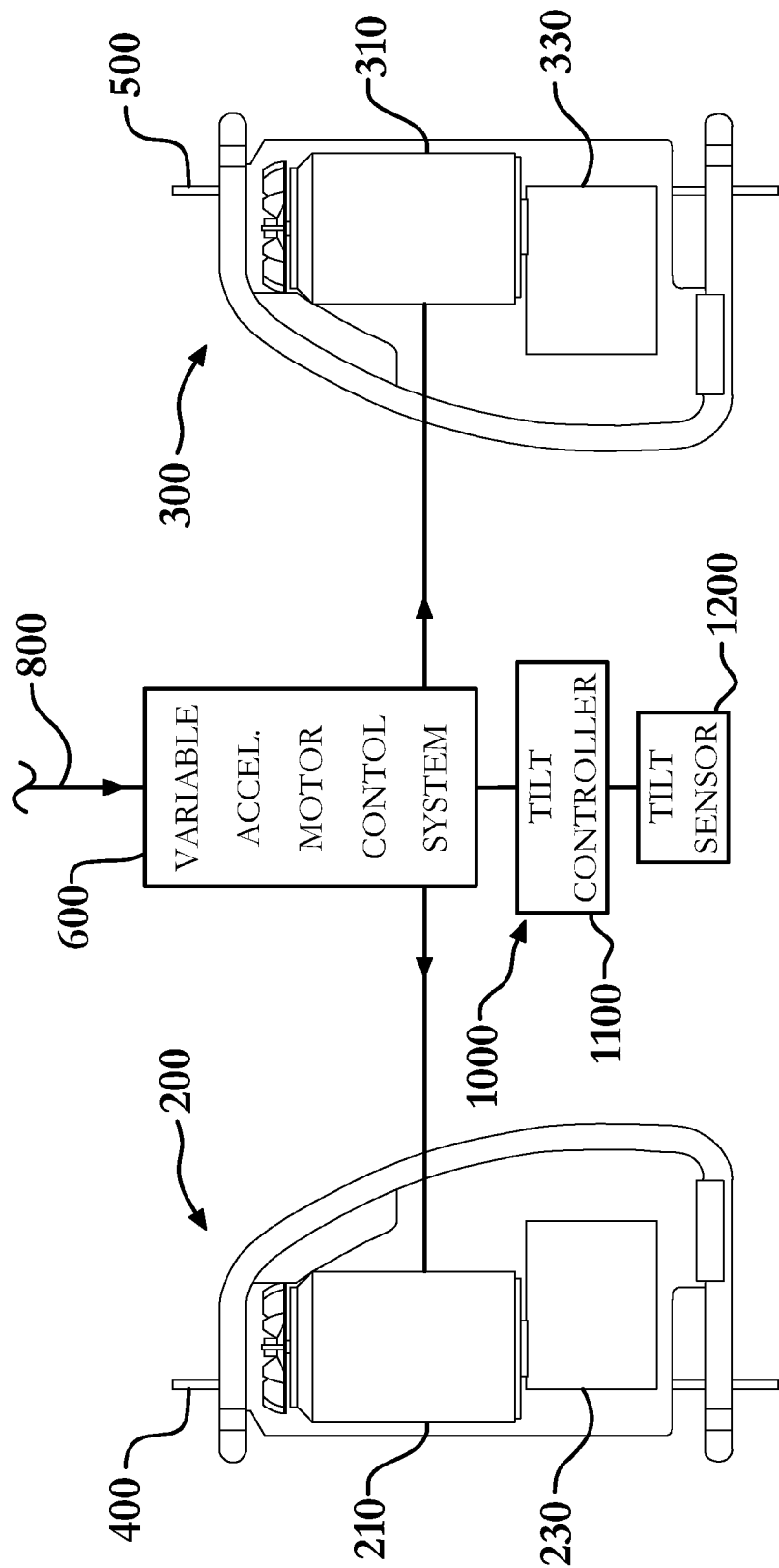
FIG. 18 is a schematic of an embodiment of the suspension work platform hoist system, not to scale.

With reference now to FIG. 18, the tilt control system (1000) includes at least one tilt controller (1100) and at least one tilt sensor (1200). The at least one tilt controller (1100) may comprise virtually any device capable of logic control, including, but not limited to, a programmable logic controller (PLC), a programmable logic device (PLD), a complex programmable logic device (CPLD), a field-programmable gate array (FPGA), DSP, microprocessor, and combinations thereof, just to name a few. In a particular embodiment, the at least one tilt controller (1100) comprises at least one FPGA. The at least one tilt controller (1100) may be programmed with a tilt control algorithm that generates a control signal based upon various input signals.

The at least one tilt sensor (1200) may comprise any device capable of detecting angular orientation or acceleration forces, including, but not limited to, electrolytic tilt sensors, magnetic tilt sensors, inclinometers, gyroscopes, accelerometers, and combinations thereof, just to name a few. In one embodiment, the at least one tilt sensor (1200) comprises at least one micro electro-mechanical systems (MEMS) based accelerometer. The at least one MEMS-based accelerometer may be a single-axis accelerometer, a multi-axis accelerometer, and combinations thereof, and may have either analog outputs or digital outputs.

The tilt control system (1000) may be in direct electrical communication with the constant frequency input power source (800). Alternatively, in some embodiments, the tilt control system (1000) may receive power indirectly from the constant frequency input power source (800) through the variable acceleration motor control system (600) or the platform control system (700), each of which may be in direct electrical communication with the constant frequency input power source (800) and the tilt control system (1000).

As seen in FIG. 18, the at least one tilt controller (1100) is in electrical communication with the variable acceleration motor control system (600) and the at least one tilt sensor (1200). As previously mentioned, the at least one tilt sensor (1200) may have either analog outputs or digital outputs that interface with the at least one tilt controller (1100). In one embodiment, the at least one tilt controller (1100) includes outputs that interface with the variable acceleration motor control system (600) via RS-485 communication lines.

The operation of the tilt control system (1000) will now be discussed in relation to FIG. 17. As seen in FIG. 17, the work platform (100) has deviated from the horizontal, with the dextral end (120) positioned higher than the sinistral end (110). The tilt control system (1000) is capable of detecting the tilt angle and controlling the variable acceleration motor control system (600) so that the work platform (100) reaches and maintains a tilt angle setpoint as the work platform (100) is raised and lowered. For example, the at least one tilt sensor (1200) will sense the tilt angle of the work platform (100) and generate a work platform tilt signal that corresponds to the sensed tilt angle. Next, the work platform tilt signal is received by the at least one tilt controller (1100). As mentioned above, the at least one tilt controller (1100) is programmed with a tilt control algorithm that utilizes the work platform tilt signal to generate a speed control signal. Finally, the variable acceleration motor control system (600) receives the speed control signal and controls the operation of the sinistral motor (210) and the dextral motor (310) accordingly to reach and maintain the tilt angle setpoint as the work platform (100) is raised and lowered.

Once again considering FIG. 17, and assuming that the tilt angle setpoint is set at a 0° tilt angle, the tilt control system (1000) will communicate with the variable acceleration motor control system (600) so that the work platform (100) reaches and maintains a 0° tilt angle. For example, in FIG. 17 the work platform (100) is in a tilted state with the dextral end (120) positioned higher than the sinistral end (110). The tilt control system (1000) will recognize the deviation from the desired 0° tilt angle and will generate appropriate speed control signals that are transmitted to and received by the variable acceleration motor control system (600). For example, the at least one tilt controller (1100) may generate a speed control signal that instructs the variable acceleration motor control system (600) to increase the speed of the sinistral motor (210) to allow the work platform (100) to reach a 0° tilt angle as the work platform (100) is being raised or lowered. Alternatively, the at least one tilt controller (1100) may generate a speed control signal that instructs the variable motor control system (600) to decrease the speed of the dextral motor (310) to allow the work platform (100) to reach a 0° tilt angle as the work platform (100) is being raised or lowered. Even further, the at least one tilt controller (1100) may generate a speed control signal that instructs the variable motor control system (600) to increase the speed of the sinistral motor (210) and to decrease the speed of the dextral motor (310) to allow the work platform (100) to reach a 0° tilt angle as the work platform (100) is being raised or lowered. In essence, the tilt control system (1000) acts as a feedback control loop that continuously monitors the work platform (100) tilt angle and continuously communicates speed control signals to the variable acceleration motor control system (600) to control the operation of the sinistral motor (210) and the dextral motor (310) to reach and maintain the tilt angle setpoint.

Figure 19:
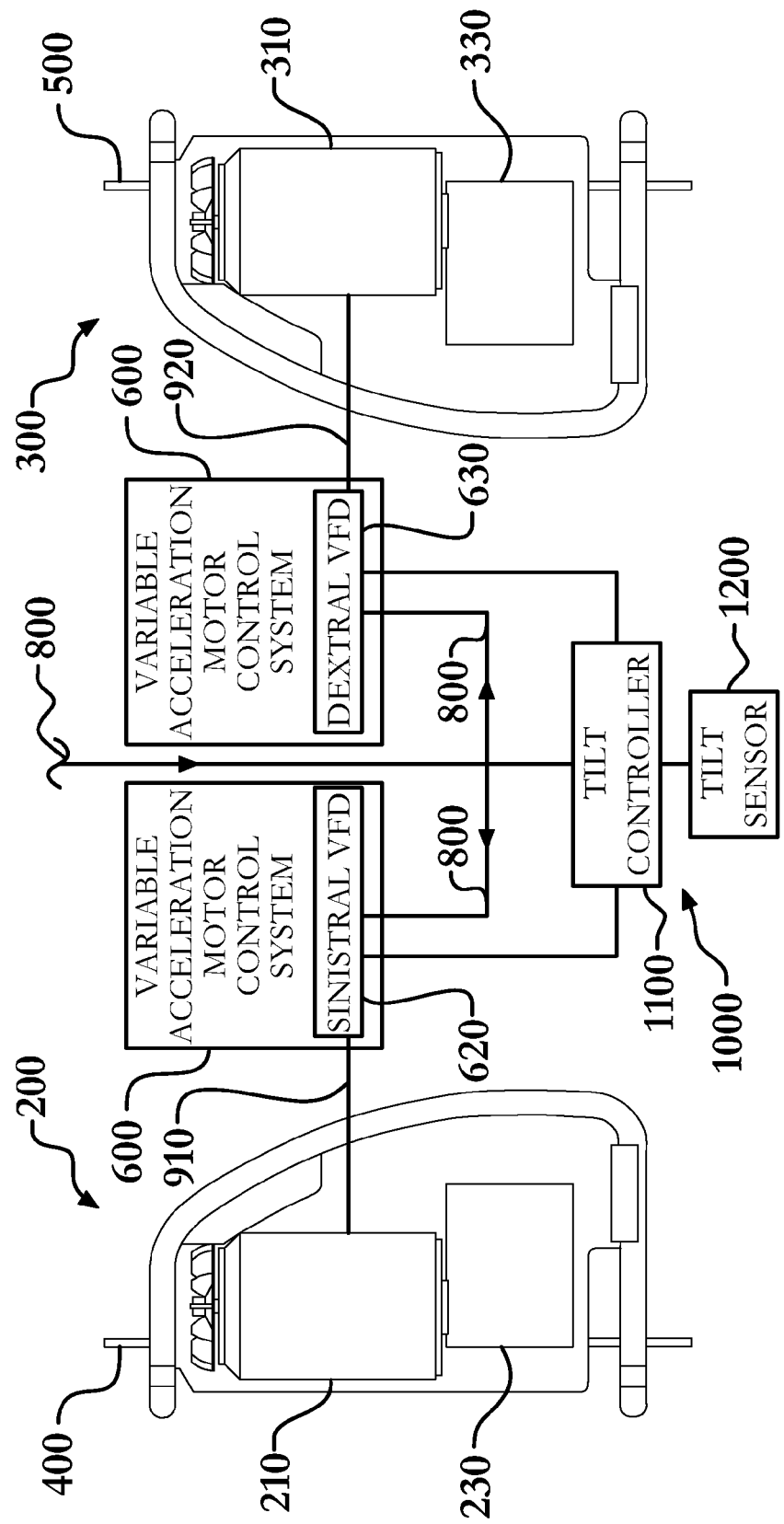
FIG. 19 is a schematic of an embodiment of the suspension work platform hoist system, not to scale.

Referring now to FIG. 19, and as discussed above, the variable acceleration motor control system (600) may include a sinistral variable frequency drive (620) and a dextral variable frequency drive (630). The sinistral variable frequency drive (620) converts the constant frequency input power source to a sinistral variable frequency power supply (910) in electrical communication with the sinistral motor (210), while the dextral variable frequency drive (630) converts the constant frequency input power source to a dextral variable frequency power supply (920) in electrical communication with the dextral motor (310). In this particular embodiment, the at least one tilt controller (1100) is in electrical communication with the sinistral variable frequency drive (620) and the dextral variable frequency drive (630). The sinistral variable frequency drive (620) receives the speed control signal generated by the at least one tilt controller (1100) and controls the operation of the sinistral motor (210) accordingly. Similarly, the dextral variable frequency drive (630) receives the speed control signal generated by the at least one tilt controller (1100) and controls the operation of the dextral motor (310) accordingly. As a result, the operation of the sinistral and dextral motors (210, 310) is controlled so that the work platform (100) maintains the tilt angle setpoint when raised and lowered.

Figure 20:
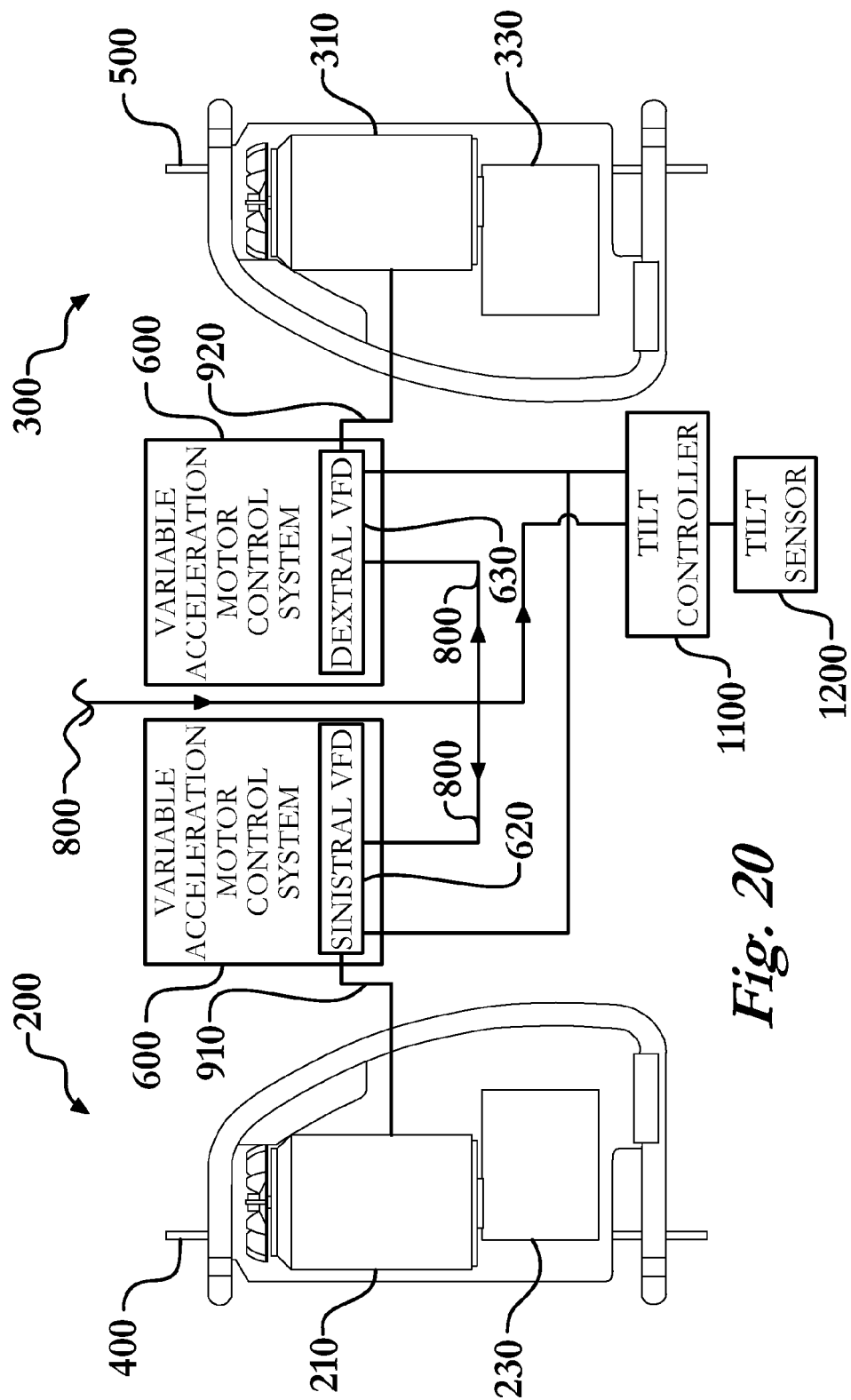
FIG. 20 is a schematic of an embodiment of the suspension work platform hoist system, not to scale.

As previously described, the sinistral variable frequency drive (620) may be housed within the sinistral hoist (200), and the dextral variable frequency drive (630) may be housed within the dextral hoist (300). In one embodiment, the at least one tilt controller (1100) and the at least one tilt sensor (1200) are housed within one of the sinistral hoist (200) or the dextral hoist (300). For example, and as seen in FIG. 20, the at least one tilt controller (1100) and the at least one tilt sensor (1200) are housed within the dextral hoist (300). However, it is noted that the at least one tilt controller (1100) remains in electrical communication with the sinistral and dextral variable frequency drives (620, 630). In this specific embodiment, the dextral hoist (300) can be thought of as a master hoist that issues control instructions to a slave hoist, which in this case would be the sinistral hoist (200).

Figure 21:
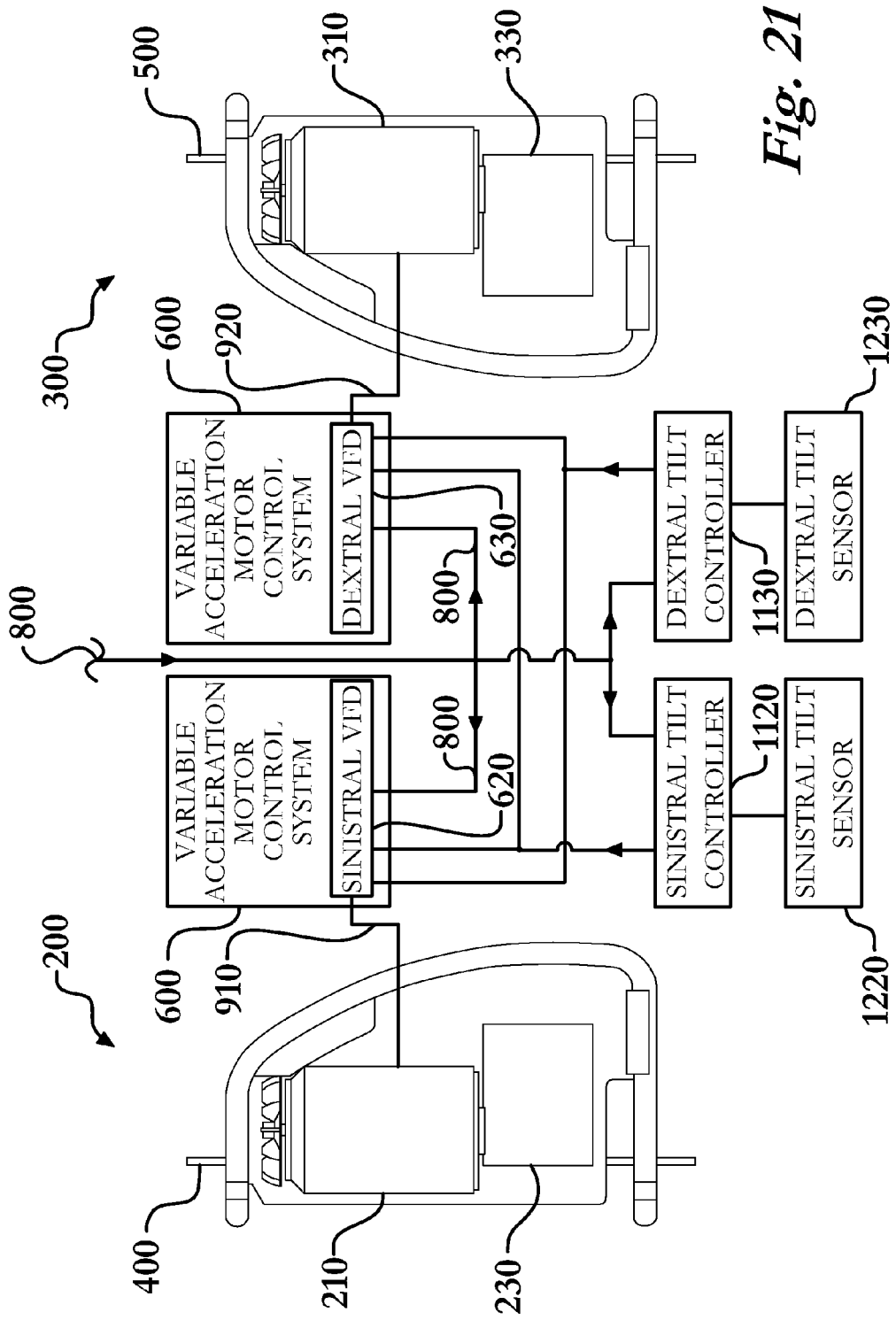
FIG. 21 is a schematic of an embodiment of the suspension work platform hoist system, not to scale.

Taking the previous embodiment a step further, and referring now to FIG. 21, the tilt control system (1000) may include a sinistral tilt controller (1120), a dextral tilt controller (1130), a sinistral tilt sensor (1220), and a dextral tilt sensor (1230). In this particular embodiment, the sinistral tilt controller (1120) and the sinistral tilt sensor (1220) are housed within the sinistral hoist (200), while the dextral tilt controller (1130) and the dextral tilt sensor (1230) are housed within the dextral hoist (300). As seen in FIG. 21, the sinistral tilt controller (1120) is in electrical communication with the sinistral variable frequency drive (620), the dextral variable frequency drive (630), and the sinistral tilt sensor (1220).

Similarly, the dextral tilt controller (1130) is in electrical communication with the sinistral variable frequency drive (620), the dextral variable frequency drive (630), and the dextral tilt sensor (1230). In this particular embodiment, the sinistral hoist (200) and the dextral hoist (300) each have the ability to serve as a master hoist that issues control instructions to the slave hoist.

Figure 22:
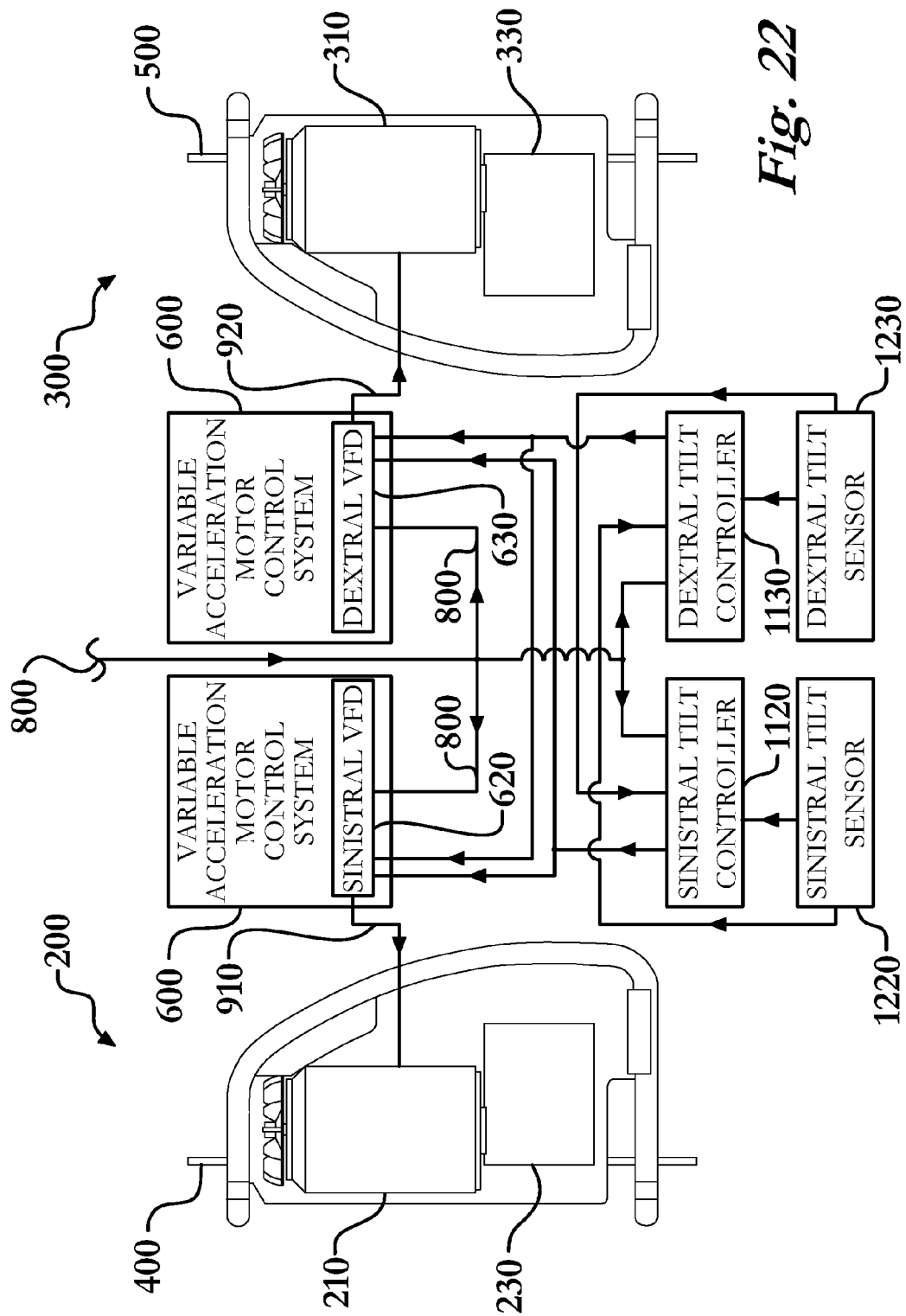
FIG. 22 is a schematic of an embodiment of the suspension work platform hoist system, not to scale.

In yet a further embodiment, as seen in FIG. 22, the sinstral tilt controller (1120) may additionally be in electrical communication with the dextral tilt sensor (1230), and the dextral tilt controller (1130) may additionally be in electrical communication with the sinistral tilt sensor (1220). This particular configuration provides the tilt control system (1000) with redundant tilt sensing capabilities that can control the tilt angle of the work platform (100) upon failure of either the sinistral tilt sensor (1220) or the dextral tilt sensor (1230).

The tilt control system (1000) may be configured with various safety features. For example, in one embodiment, the tilt control system (1000) may include a high-tilt alarm. In this embodiment, the at least one tilt controller (1100) will generate a high-tilt alarm signal if the at least one tilt sensor (1200) senses a tilt angle that is above an alarm limit tilt angle. For instance, if the alarm limit tilt angle is set at a 10° tilt angle, the at least one tilt controller (1100) will generate a high-tilt alarm signal when the at least one tilt sensor (1200) senses a tilt angle above 10°. The high-tilt alarm signal is communicated to the variable motor acceleration control system (600) and instructs the variable motor acceleration control system (600) to prevent further operation of the sinistral motor (210) and the dextral motor (310).

In yet a further embodiment, the tilt control system (1000) may include a settling mode. The settling mode includes a settling tilt angle setpoint, and prevents the work platform (100) from being raised or lowered until the tilt angle of the work platform (100) reaches the settling tilt angle setpoint. In operation, the at least one tilt controller (1100) may generate control signals that instruct the variable acceleration motor control system (600) to incrementally operate the sinistral motor (210) and dextral motor (310) until the work platform (100) reaches the settling tilt angle setpoint. When the work platform (100) tilt angle, as sensed by the at least one tilt sensor (1200), reaches the settling tilt angle setpoint, the work platform (100) may be raised or lowered. In many instances, but not all, the settling tilt angle setpoint may be set at a 0° tilt angle, which corresponds to a substantially horizontal orientation. Ensuring that the work platform (100) is substantially level allows for higher safety trajectories when the work platform (100) is raised or lowered.

Figure 23:
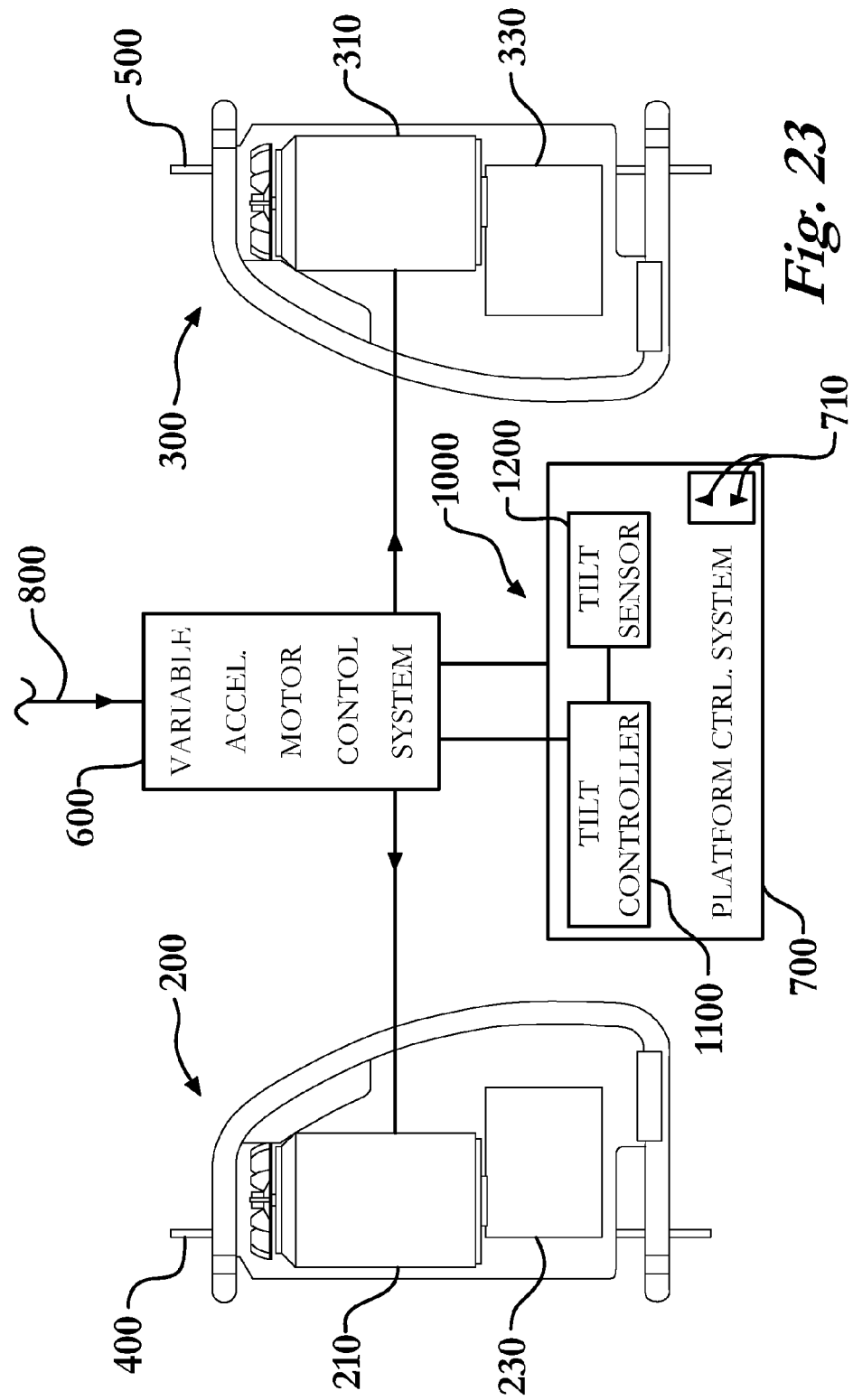
FIG. 23 is a schematic of an embodiment of the suspension work platform hoist system, not to scale.

As previously mentioned, the work platform hoist system (10) may include a platform control system (700), which is often referred to in the industry as a central control box (CCB). Generally, the platform control system (700) is in electrical communication with the variable acceleration motor control system (600), the sinistral motor (210), and the dextral motor (310), and includes a user input device (710) designed to accept instructions to raise or lower the work platform (100). The tilt control system (1000), as previously discussed, may be incorporated into embodiments of the work platform hoist system (10) that include a platform control system (700). In one particular embodiment, the at least one tilt controller (1100) and the at least one tilt sensor (1200) may integrated into the platform control system (700), as seen in FIG. 23. For example, the at least one tilt controller (1100) and the at least one tilt sensor (1200) may be connected to the PCB of the platform control system (700).

Figure 24:
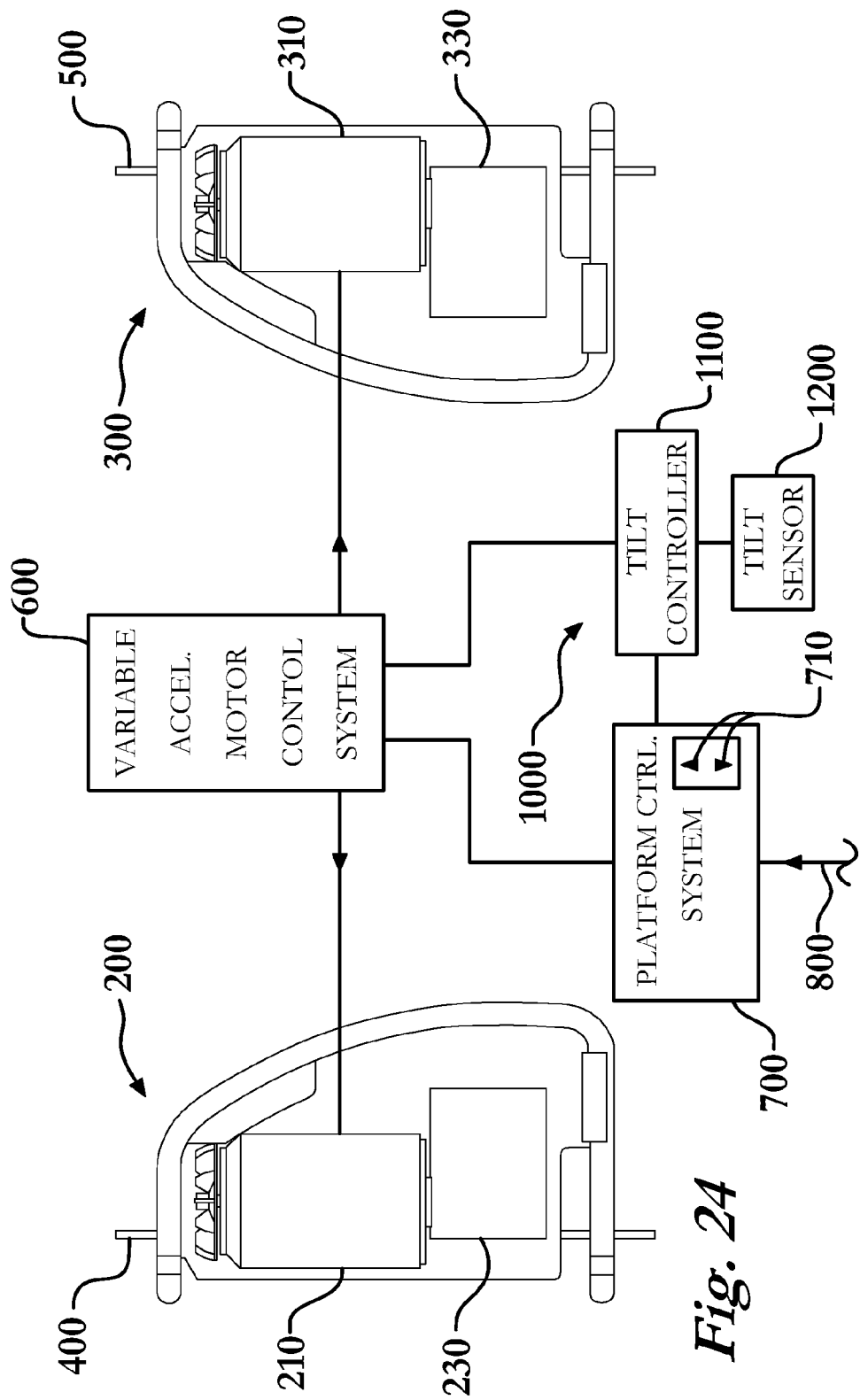
FIG. 24 is a schematic of an embodiment of the suspension work platform hoist system, not to scale.

Referring now to FIG. 24, an additional embodiment of the work platform hoist system (10) including a platform control system (700) is shown. In this particular embodiment, the platform control system (700) is in direct electrical communication with a constant frequency input power source (800) and includes a user input device (710) configured to at least accept instructions to raise or lower the work platform (100). As seen in FIG. 24, both the variable acceleration motor control system (600) and the tilt control system (1000) are in electrical communication with the platform control system (700). Thus, in this embodiment, the platform control system (700) distributes power to the variable acceleration motor control system (600) and the tilt control system (1000).

Still referring to FIG. 24, the variable acceleration motor control system (600) is in electrical communication with the sinistral motor (210) and the dextral motor (310), and the tilt control system (1000) is in electrical communication with the variable acceleration motor control system (600). This particular embodiment operates in basically the same way as the previously discussed embodiments that include a tilt control system (1000). For example, the at least one tilt controller (1100) is in electrical communication with the at least one tilt sensor (1200) and with the variable acceleration motor control system (600), such as by RS-485 communication lines. In operation, the at least one tilt sensor (1200) senses the tilt angle of the work platform (100) and generates a work platform tilt signal that corresponds to the sensed tilt angle. Next, the work platform tilt signal is received by the at least one tilt controller (1100). The at least one tilt controller (1100) will then generate a speed control signal based upon the work platform tilt signal received from the at least one tilt sensor (1200). Finally, the variable acceleration motor control system (600) receives the speed control signal and controls the operation of the sinistral motor (210) and the dextral motor (310) accordingly to reach and maintain the tilt angle setpoint as the work platform (100) is raised and lowered.

The features and variations discussed above with respect to the various embodiments of the work platform hoist system (10) may be utilized with this particular embodiment. For example, the variable acceleration motor control system (600) may include one or more variable frequency drives (610, 620, 630), and a sinistral and dextral variable frequency drive (620, 630) may be housed within the sinistral hoist (200) and the dextral hoist (300), respectively. Additionally, this embodiment may include a sinstral tilt controller (1120) and a sinistral tilt sensor (1220) housed within the sinistral hoist (200), and a dextral tilt controller (1130) and a dextral tilt sensor (1230) housed within the dextral hoist (300). Moreover, this particular embodiment may be configured such that the at least one tilt controller (1100) and the at least one tilt sensor (1200) are integrated into the platform control system (700), as discussed above.

An additional feature found in this particular embodiment relates to the safety of the work platform hoist system (10). As discussed previously, the tilt control system (1000) continuously monitors the work platform (100) tilt angle and continuously communicates speed control signals to the variable acceleration motor control system (600) to control the operation of the sinistral motor (210) and the dextral motor (310). However, if communications between the at least one tilt controller (1100) and the variable acceleration motor control system (600) are compromised, there is a high probability that the work platform (100) would begin to tilt and lead to an unsafe condition. In this particular embodiment, the at least one tilt controller (1100) will generate a high-tilt alarm signal if the at least one tilt sensor (1200) senses a tilt angle that is above an alarm limit tilt angle. For instance, if the alarm limit tilt angle is set at a 10° tilt angle, the at least one tilt controller (1100) will generate a high-tilt alarm signal when the at least one tilt sensor (1200) senses a tilt angle above 10°. The high-tilt alarm signal is communicated to the platform control system (700), which may generate a visible and/or audible alarm, or alternatively may shut off power to the variable motor acceleration control system (600) to prevent further operation of the sinistral motor (210) and the dextral motor (310).

Yet another embodiment the platform control system (700) includes an intelligent control system for the suspension work platform hoist system (10). The intelligent control system is responsible for issuing speed commands at least one hoist motor (210) by responding to various user inputs, and supervising the overall ascent or descent of the work platform (100) in a controlled manner. The intelligent control system is both a real time controller and sequential controller. In a further embodiment, the sequential control functions are handled by a Programmable Logic Controller (PLC), and real time controls are handled by a dedicated microprocessor or Field Programmable Gate Array (FPGA.)

The intelligent control system includes both analog and digital electronic circuitry to provide a fail safe mechanism and logic redundancy for the safe and reliable operation of the suspension work platform hoist system (10). The analog circuit component includes the sensing of current that is being supplied to the control coils of the various contactors that apply power to the at least one motor (210), and the recloser function is accomplished by digital circuit component that attempts to open and close the control power supply to the control coils of said contactors. Such an arrangement discerns whether a fault is valid or not, when actuating a contactor coil that distributes AC electrical power to the at least one motor (210). By discerning whether a fault is valid or not, the integrity of a ascent or descent of the work platform (100) can be maintained, particularly in the case where a fault is invalid. The ability of the intelligent control system to determine whether a fault exists when actuating a contactor coil is classified as a diagnostic function. Additionally, the intelligent control system incorporates the ability to provide a prognostic function. The prognostic function deals with the ability of the intelligent control system to determine that a voltage actuation circuit on the suspension work platform hoist system (10) is itself bad, or that a contactor control coil has simply aged. The prognostic function is performed even when no coil actuation is needed. The realized advantage of this approach is to determine that a fault has occurred (diagnostic), or has a significant probability to occur (prognostic) before ascent or descent. A schematic of the intelligent control system is provided in FIG. 28.

One advantage of the intelligent control system is that is has the ability to recognize if control power has been lost to control contactors, and alert the users on the work platform (100) of the loss of control power. By having separate power supplies for the digital control and the power being supplied to the control coils of the power contactors supplying power to the at least one hoist motor (210), the digital controls can operate and communicate when a faulted condition occurs at the control coils.

Figure 28:
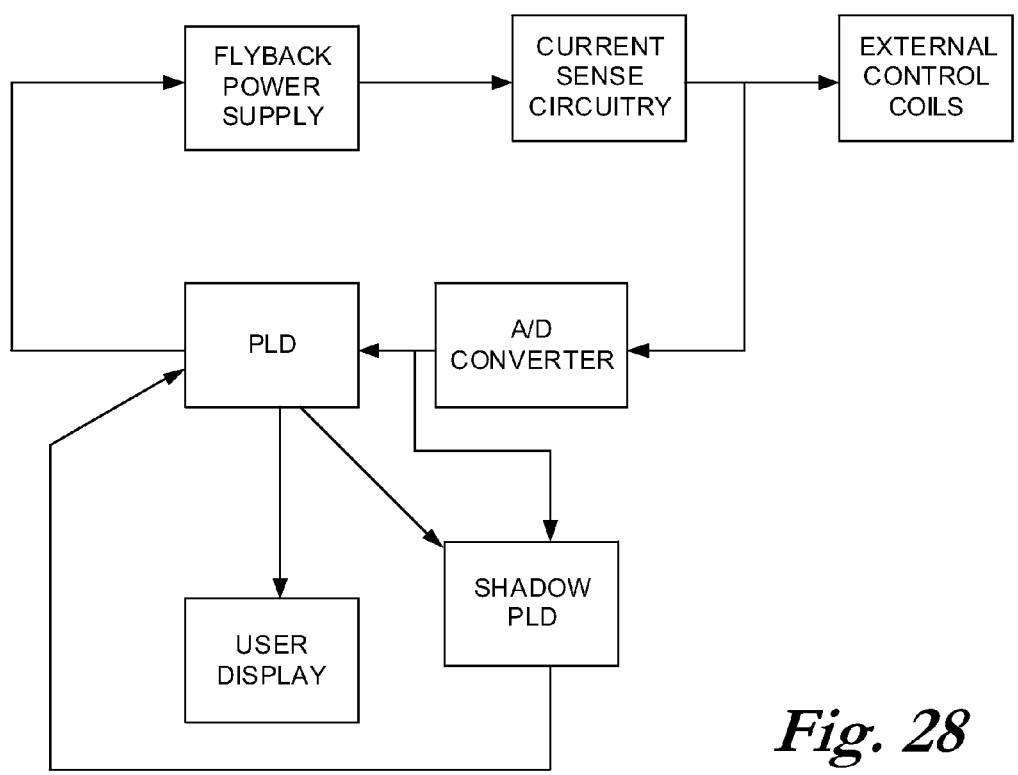
FIG. 28 is a partial schematic view of an embodiment the intelligent control system, not to scale.
Figure 29:
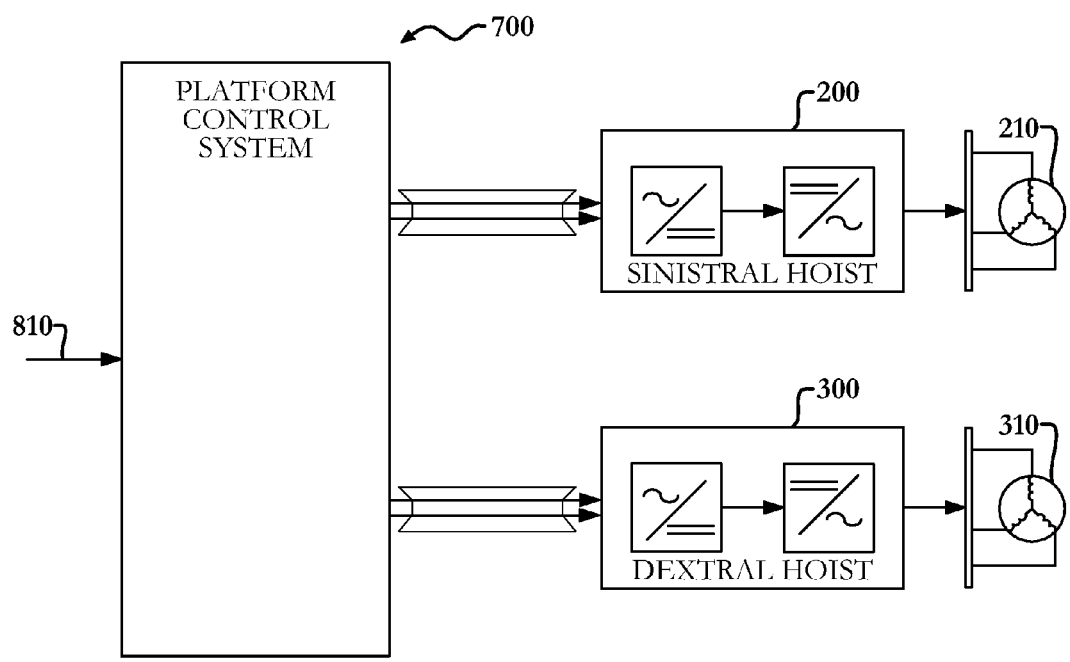
FIG. 29 is a partial schematic view of an embodiment the platform control system, not to scale.

In a suspension work platform hoist system (10) safety and reliability are of paramount importance. As seen in the schematic of FIG. 29, the platform control system (700) will distribute power to at least one hoist motor (210), via contactors that will distribute the incoming electrical power if their control coils are duly energized. In this particular embodiment, 24 Vdc is used to control the contactor control coils. In the case that there is a faulted condition in at least one of numerous control coils suspension work platform hoist system (10), then without proper recognition of this fault, the control circuits will not know that power is either inadvertently applied or not applied at all. In one particular embodiment this fault detection system a combined analog circuit and digital circuit that is linked to dual Programmable Logic Devices (PLD) to insure fault redundancy and logic recognition, as shown in FIG. 28. A differential current sensing amplifier monitors the outgoing 24 V line, and an analog to digital converter transforms this measurement into the digital domain, where it is acquired by one PLD. A second PLD is also monitoring the same information. If excessive current is detected, and both the first PLD and the second PLD concur that this condition is true, then the main PLD will disable the primary power supply supplying 24V. In an even further embodiment, a flyback power supply may continue to supply current even when the output is shorted, and will continue to supply current until either components fail or the Pulse Width Modulation (PWM) action of the power supply is disabled. Thus, in this particular embodiment the intelligent control system (i) can attempt to restart the power supply N number of times, where N is variable and under the control of the main PLD device, (ii) after said N attempts at trying to restart the power supply, the main PLD will stop the attempts and report a failure, and (iii) allow the user to instruct the main PLD to continue enabling the power supply, even in a faulted condition, to identify the source of the fault and hence allow users on the platform, or on the ground, advanced diagnostic capability.

In yet further embodiments the suspension work platform hoist system (10) may control the speed, torque, direction, and resulting horsepower of the sinistral motor (210) and the dextral motor (310). The suspension work platform hoist system (10) may include voltage-source inverter (VSI) type or current-source inverter (CSI) type inverters. Additionally, the suspension work platform hoist system (10) may incorporate silicon control rectifier (SCR) technology, insulated gate bipolar transistors (IGBT), and/or pulse-width-modulation (PWM) technology. Further, the suspension work platform hoist system (10) may provide soft-start capability that decreases electrical stresses and line voltage sags associated with full voltage motor starts.

In one embodiment, the variable frequency drives (610, 620, 630) and DC-AC inverter (670) of the suspension work platform hoist system (10) utilize current ratings between 4 kHz and 22 kHz carrier frequency. Even further, the carrier frequency may be automatically reduced as load is increased. The suspension work platform hoist system (10) may facilitate manual stop/start, speed control, local/remote status indication, manual or automatic speed control selection, and run/jog selection. Additionally, the suspension work platform hoist system (10) may incorporate a command center to serve as a means to configure controller parameters such as Minimum Speed, Maximum Speed, Acceleration and Deceleration times, Volts/Hz ratio, Torque Boost, Slip Compensation, Overfrequency Limit, and Current Limit. The hoists (200, 300) may include an LED or LCD display mounted on the door of the cabinet that digitally indicates frequency output, voltage output, current output, motor RPM, input kW, elapsed time, time-stamped fault indication, and/or DC Bus Volts. In one embodiment the suspension work platform hoist system (10) includes multiple programmable preset speeds which assign an initial preset speed upon a user contact closure. Further, suspension work platform hoist system (10) may include an isolated electrical follower capability to enable it to follow a 0-20 mA, 4-20 mA or 0-4, 0-8, 0-10 volt DC grounded or ungrounded speed signal. Additionally, the suspension work platform hoist system (10) may provide isolated 0-10 V or 4-20 ma output signals for computer controlled feedback signals that are selectable for speed or current. Additionally, further embodiments may include the following protective features: output phase-to-phase short circuit condition, total ground fault under any operating condition, high input line voltage, low input line voltage, and/or loss of input or output phase. The suspension work platform hoist system (10) may provide variable acceleration and deceleration periods of between 0.1 and 999.9 seconds.

The traction mechanisms (220, 320) discussed herein are designed to grip the respective ropes (400, 500) and may be of the solid sheave type, which are known in the art and are currently available via Sky Climber, Inc. of Delaware, Ohio. Further, the gearboxes (230, 330) are planetary and worm gear systems designed to reduce the rotational speed of the motors (210, 310) to a usable speed. One with skill in the art will appreciate that other gear systems may be incorporated in the gearboxes (210, 310). Additionally, the power terminals (240, 245, 340, 345) discussed herein can take virtually any form that facilitates the establishment of electrical communication between the terminal and a conductor. While the disclosure herein refers to two hoists, namely the sinistral hoist (200) and the dextral hoist (300), one with skill in the art will appreciate that the suspension work platform hoist system (10) of the present invention may incorporate a single hoist or more than two hoists. Similarly, while the present description focuses on a single rope (400, 500) per hoist (200, 300), one with skill in the art will appreciate that the present invention also covers applications that require multiple ropes for each hoist, as is common in Europe.

Each of the housings (250, 350) may include separate compartments for housing the controls and electronics. Generally, the electronic components used in the system (10) must be maintained within a given ambient temperature range, thus it is convenient to house all such components in a temperature controlled environment. The temperature of the electronics compartment may be maintained using any number of conventional temperature maintenance methods commonly known by those with skill in the art. Alternatively, the compartment may be coated with an altered carbon molecule based coating that serves to maintain the compartment at a predetermined temperature and reduce radiation.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

We claim:

1. A suspension work platform hoist system (10) for raising and lowering a work platform (100) on a rope (400), the suspension work platform hoist system (10) powered by a constant frequency input power source (800) via a suspended conductor system (810), comprising:
a hoist (200) having a motor (210), a traction mechanism (220) designed to cooperate with the rope (400), and a gearbox (230) for transferring power from the motor (210) to the traction mechanism (220), wherein the hoist (200) is releasably attached to the work platform (100);
a reactive power reducing input power system (1300) releasably attached to the work platform (100) and in electrical communication with the motor (210) and the constant frequency input power source (800), via a suspended conductor system (810), wherein the reactive power reducing input power system (1300) decreases the magnitude of the reactive power of the motor (210) producing a hoist system power factor of at least 0.95 when operating at a steady state full-load condition as the motor (210) raises the work platform (100) on the rope (400).

2. The suspension work platform hoist system (10) of claim 1, further including a descent control system (690), wherein in an emergency descent mode the descent control system (690) electromagnetically controls the emergency descent of the work platform (100) under the influence of gravity and limits the emergency descent velocity to 60 feet per minute.

3. The suspension work platform hoist system (10) of claim 2, wherein the descent control system (690) creates a descent circuit connected to two terminals of the motor (210) and contains at least one descent capacitor thereby allowing the motor (210) to function as a generator creating a descent voltage of 100 VAC to 400 VAC across the at least one descent capacitor, wherein the at least one descent capacitor has a capacitance in μF of at least 2.5 times the maximum desired descent velocity in feet per minute.

4. The suspension work platform hoist system (10) of claim 3, wherein the descent control system (690) electromagnetically controls the emergency descent of the work platform (100) under the influence of gravity and limits the emergency descent velocity to 35 feet per minute, wherein the at least one descent capacitor has a capacitance in μF of less than 10 times the maximum desired descent velocity in feet per minute.

5. The suspension work platform hoist system (10) of claim 1, wherein the reactive power reducing input power system (1300) includes an AC-DC converter (640) and a regulator system (650), wherein the regulator system (650) is in electrical communication with a DC-AC inverter (670) in electrical communication with the motor (210), wherein the DC-AC inverter (670) controls the rate at which the motor (210) accelerates the traction mechanism (220) thereby controlling the acceleration of the work platform (100) as the work platform (100) is raised and lowered on the rope (400).

6. The suspension work platform hoist system (10) of claim 5, further including an isolation system (680) that electrically isolates the DC-AC inverter (270) from the motor (210) when the DC-AC inverter (270) is not transmitting power to the motor (210).

7. The suspension work platform hoist system (10) of claim 6, further including a descent control system (690) between the isolation system (680) and the motor (210), wherein in an emergency descent mode the descent control system (690) electromagnetically controls the emergency descent of the work platform (100) under the influence of gravity and limits the emergency descent velocity to 60 feet per minute.

8. The suspension work platform hoist system (10) of claim 7, wherein the descent control system (690) creates a descent circuit connected to two terminals of the motor (210) and contains at least one descent capacitor thereby allowing the motor (210) to function as a generator creating a descent voltage of 100 VAC to 400 VAC across the at least one descent capacitor wherein the at least one descent capacitor has a capacitance in μF of at least 2.5 times the maximum desired descent velocity in feet per minute.

9. The suspension work platform hoist system (10) of claim 8, wherein the descent control system (690) electromagnetically controls the emergency descent of the work platform (100) under the influence of gravity and limits the emergency descent velocity to 35 feet per minute, wherein the at least one descent capacitor has a capacitance in μF of less than 10 times the maximum desired descent velocity in feet per minute.

10. The suspension work platform hoist system (10) of claim 5, wherein the reactive power reducing input power system (1300) accepts input voltages from single phase 200 VAC to three phase 480 VAC, and the regulator system (650) includes a buck regulator topology generating direct current voltage supply of less than 330 VDC to the DC-AC inverter (670).

11. The suspension work platform hoist system (10) of claim 10, wherein the buck regulator topology includes a toroidal stack having an inductance of at least 2 millihenry.

12. The suspension work platform hoist system (10) of claim 5, wherein the reactive power reducing input power system (1300) accepts a single phase voltage, and the regulator system (650) includes a boost regulator topology generating direct current voltage supply of less than 330 VDC to the DC-AC inverter (670), wherein the boost regulator has an inductance of at least 3 millihenry.

13. The suspension work platform hoist system (10) of claim 12, wherein the boost regulator topology supplies adequate power to the DC-AC inverter (670) for operation of the motor (210) when input power to the reactive power reducing input power system (1300) is between 85 VAC and 95 VAC.

14. The suspension work platform hoist system (10) of claim 10, wherein the suspension work platform hoist system (10) includes a multiple input power connection system (1400) including at least one single phase power connector (1410) and at least one three phase power connector (1420).

15. The suspension work platform hoist system (10) of claim 1, wherein the reactive power reducing input power system (1300) and the DC-AC inverter (670) occupy a volume in cubic inches that is less than three times the weight of the hoist (200) in pounds.

* * * * *